(12) United States Patent
Fuse et al.

(10) Patent No.: US 7,379,942 B2
(45) Date of Patent: May 27, 2008

(54) APPROVAL AUTHORITY REGISTRATION SYSTEM AND METHOD

(75) Inventors: Satoshi Fuse, Osaka (JP); Makoto Uenoyama, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 739 days.

(21) Appl. No.: 10/827,002

(22) Filed: Apr. 19, 2004

(65) Prior Publication Data

US 2004/0249690 A1 Dec. 9, 2004

(30) Foreign Application Priority Data

Apr. 18, 2003 (JP) ............................. 2003-114766

(51) Int. Cl.
*G06F 17/30* (2006.01)
(52) U.S. Cl. .................... 707/101; 707/102; 707/104.1
(58) Field of Classification Search ................ 707/101, 707/102, 104.1
See application file for complete search history.

(56) References Cited

U.S. PATENT DOCUMENTS 6,055,637 A * 4/2000 Hudson et al. ................ 726/20
6,088,679 A * 7/2000 Barkley .......................... 705/8
2002/0029160 A1 * 3/2002 Thompson et al. ............ 705/8
2002/0103665 A1 * 8/2002 Furumatsu ..................... 705/1

FOREIGN PATENT DOCUMENTS

EP       1 033 666 A2 *  9/2000
EP       1 033 666        7/2002
JP       08-180114        7/1996
JP       2000-315234      11/2000

* cited by examiner

*Primary Examiner*—Charles Rones
*Assistant Examiner*—Phuong-Thao Cao

(57) ABSTRACT

An approval authority registration system 100 which includes terminals 101a1-101an, a personal information database 103, and a server 102 interconnected via a network. The approval authority registration system 100 registers, with the personal information database 103, approval relation information which shows relationships between approval-authorized persons and approval object persons who are both users of the approval authority registration system 100. The server 102 receives, from a user via a terminal, a registration request requesting registration of a piece of approval relation information, judges whether the user who input the registration request matches either an approval-authorized person or an approval object person specified in the requested piece of approval relation information, and registers the piece of approval relation information with the database 103 if it judges that the user matches neither the specified approval-authorized person nor the specified approval object person.

11 Claims, 23 Drawing Sheets

| EMPLOYEE CODE | 320015 | 320021 | 320094 | 320396 | 320111 |
|---|---|---|---|---|---|
| EMPLOYEE'S NAME | GORO YODOYABASHI | TARO KITAHAMA | SHIRO SHIJO | HANAKO MARUTAMACHI | TOORU MORIGUCHI |
| BUSINESS OPERATION CODE | 00010039 (KEIHAN BUSINESS OPERATION) | 00010039 | 00010039 | 00010039 | 00010039 |
| DEPARTMENT | 20000 (ACCOUNTING DEP.) | 15000 (PRODUCTION TECH. DEP.) | 15000 | 15000 | 15000 |
| SPECIAL CLASSIFICATION | STAFF | ASSISTANT GENERAL MANAGER | ASSISTANT GENERAL MANAGER | SENIOR STAFF MEMBER | GENERAL MANAGER |
| APPROVAL-AUTHORIZED PERSON QUALIFICATION | NO | YES | YES | YES | YES |
| REGISTRATION QUALIFICATION | YES | YES | YES | YES | YES |
| EFFECTIVE PERIOD START DATE | 1999/04/01 | 1998/04/01 | 1995/04/01 | 1996/10/01 | 1995/04/01 |
| EFFECTIVE PERIOD END DATE | 9999/12/31 | 2002/06/30 | 9999/12/31 | 9999/12/31 | 9999/12/31 |

FIG.5

| BUSINESS OPERATION CODE | 00010039 (KEIHAN BUSINESS OPERATION) | 00010039 (KEIHAN BUSINESS OPERATION) | 00010039 (KEIHAN BUSINESS OPERATION) |
|---|---|---|---|
| APPROVAL OBJECT DEPARTMENT | 15000 (PRODUCTION TECH. DEP.) | 15000 (PRODUCTION TECH. DEP.) | 15000 (PRODUCTION TECH. DEP.) |
| APPROVAL-AUTHORIZED PERSON | 3200021 (TARO KITAHAMA) | 3200394 (SHIRO SHIJO) | 3200396 (HANAKO MARUTAMACHI) |
| APPROVAL-AUTHORIZED PERSON CLASSIFICATION | RESPONSIBLE | RESPONSIBLE | PROXY |
| REGISTRATION DATE | 2000/03/31 | 2002/06/30 | 2002/06/30 |
| REGISTRAR | 3200015 (GORO YODOYABASHI) | 3200015 (GORO YODOYABASHI) | 3200394 (SHIRO SHIJO) |
| EFFECTIVE PERIOD START DATE | 2000/04/01 | 2002/07/01 | 2002/07/16 |
| EFFECTIVE PERIOD END DATE | 2002/06/30 | 9999/12/31 | 2002/08/31 |

| BUSINESS OPERATION CODE | 00010039 (KEIHAN BUSINESS OPERATION) | 00010039 (KEIHAN BUSINESS OPERATION) | 00010039 (KEIHAN BUSINESS OPERATION) | 00010039 (KEIHAN BUSINESS OPERATION) |
|---|---|---|---|---|
| APPROVAL OBJECT DEPARTMENT | 15000 (PRODUCTION TECH. DEP.) | 15000 (PRODUCTION TECH. DEP.) | 15000 (PRODUCTION TECH. DEP.) | 15000 (PRODUCTION TECH. DEP.) |
| APPROVAL-AUTHORIZED PERSON | 3200021 (TARO KITAHAMA) | 3200021 (TARO KITAHAMA) | 3200394 (SHIRO SHIJO) | 3200396 (HANAKO MARUTAMACHI) |
| REGISTRATION DATE | 2000/03/31 | 2002/06/15 | 2002/06/15 | 2002/07/01 |
| REGISTRAR | 3200015 (GORO YODOYABASHI) | 3200015 (GORO YODOYABASHI) | 3200015 (GORO YODOYABASHI) | 3200394 (SHIRO SHIJO) |
| UPDATE DETAIL | NEWLY REGISTERED | EFFECTIVE PERIOD END DATE UPDATED | NEWLY REGISTERED | NEWLY REGISTERED |

| BUSINESS OPERATION CODE | 00010039 (KEIHAN BUSINESS OPERATION) | 00010039 (KEIHAN BUSINESS OPERATION) |
|---|---|---|
| APPROVAL-AUTHORIZED PERSON | 3200111 (TORU MORIGUCHI) | 3200111 (TORU MORIGUCHI) |
| APPROVAL-AUTHORIZED PERSON CLASSIFICATION | RESPONSIBLE | RESPONSIBLE |
| APPROVAL OBJECT PERSON | 3200021 (TARO KITAHAMA) | 3200394 (SHIRO SHIJO) |
| REGISTRATION DATE | 2000/03/31 | 2002/06/15 |
| REGISTRAR | 3200015 (GORO YODOYABASHI) | 3200015 (GORO YODOYABASHI) |
| EFFECTIVE PERIOD START DATE | 2000/04/01 | 2002/07/01 |
| EFFECTIVE PERIOD END DATE | 2002/06/30 | 9999/12/31 |

| BUSINESS OPERATION CODE | 00010039 (KEIHAN BUSINESS OPERATION) | 00010039 (KEIHAN BUSINESS OPERATION) | 00010039 (KEIHAN BUSINESS OPERATION) |
|---|---|---|---|
| APPROVAL-AUTHORIZED PERSON | 3200111 (TORU MORIGUCHI) | 3200111 (TORU MORIGUCHI) | 3200111 (TORU MORIGUCHI) |
| APPROVAL OBJECT PERSON | 3200021 (TARO KITAHAMA) | 3200021 (TARO KITAHAMA) | 3200394 (SHIRO SHIJO) |
| REGISTRATION DATE | 2000/03/31 | 2002/06/15 | 2002/06/15 |
| REGISTRAR | 3200015 (GORO YODOYABASHI) | 3200015 (GORO YODOYABASHI) | 3200015 (GORO YODOYABASHI) |
| UPDATE DETAIL | NEWLY REGISTERED | EFFECTIVE PERIOD END DATE UPDATED | NEWLY REGISTERED |

FIG.9

| BUSINESS OPERATION CODE | 00010039(KEIHAN BUSINESS OPERATION) |
|---|---|
| DEPARTMENT | 15000(PRODUCTION TECH. DEP.) |
| APPROVAL ITEM | TRAVEL EXPENSE PAYMENT |
| APPROVAL REQUEST MANAGEMENT NUMBER | 10001210 |
| APPROVAL REQUESTER | 32001111(TORU MORIGUCHI) |
| APPROVAL REQUEST CONTENTS | 2002/06/30PAYMENT OF 52,000 YEN FOR TRAVEL TO TOKYO ON 2002/06/30 |
| APPROVAL REQUEST DATE/TIME | 2002/07/02  15:00 |

| BUSINESS OPERATION CODE | 00010039(KEIHAN BUSINESS OPERATION) | 00010039(KEIHAN BUSINESS OPERATION) |
|---|---|---|
| APPROVAL-AUTHORIZED PERSON | 3200394(SHIRO SHIJO) | 3200396 (HANAKO MARUTAMACHI) |
| APPROVAL ITEM | TRAVEL EXPENSE PAYMENT | TEMPORARY DISBURSEMENT REQUEST |
| APPROVAL REQUEST MANAGEMENT NUMBER | 10001210 | 50000201 |
| APPROVAL REQUESTER | 3200111(TORU MORIGUCHI) | 3200107(TAKESHI DOI) |
| CONSIDERATION RESULTS | APPROVAL | DENIAL |
| APPROVAL/DENIAL DATE | 2002/07/02  15:00 | 2002/07/03 09:38 |

FIG.19

PLEASE BE NOTIFIED THAT
EFFECTIVE PERIOD
FOR PROXY YOU REGISTERED
EXPIRES WITHIN 7 DAYS

FIG.20A

PLEASE BE NOTIFIED THAT
EFFECTIVE PERIOD
FOR PROXY YOU REGISTERED
EXPIRES WITHIN 7 DAYS

PROXY 3200396
(HANAKO MARUTAMACHI)

APPROVAL OBJECT DEPARTMENT
15000 (PRODUCTION TECH.DEP.)

EFFECTIVE PERIOD END DATE
2002/08/31

FIG.20B

PLEASE BE NOTIFIED THAT
EFFECTIVE PERIOD
FOR PROXY YOU REGISTERED
EXPIRES WITHIN 7 DAYS

PROXY 3200396
(HANAKO MARUTAMACHI)

APPROVAL OBJECT PERSON
320107 (TAKESHI DOI)

EFFECTIVE PERIOD END DATE
2002/08/31

ORGANIZATION CHART OF PRODUCTION TECH. DEP. OF KEIHAN BUSINESS OPERATION (BEFORE ORGANIZATIONAL CHANGE)

ORGANIZATION CHART OF PRODUCTION TECH. DEP. OF KEIHAN BUSINESS OPERATION (AFTER ORGANIZATIONAL CHANGE)

FIG.22

REGISTRATION OF CURRENTLY INPUT DATA WILL GENERATE NO-APPROVAL-AUTHORIZED-PERSON PERIOD.
REENTER APPROPRIATE EFFECTIVE PERIOD START DATE.

APPROVAL AUTHORITY REGISTRATION SYSTEM AND METHOD

BACKGROUND OF THE INVENTION (1) Field of the Invention

The present invention relates to an approval authority registration system which comprises terminals, a database, and a database management apparatus interconnected via a network, and in particular relates to an approval authority registration system that registers, with the database, approval relation information sent from the terminals which shows relationships between approval-authorized persons and approval object persons.

(2) Description of the Related Art

In conventional organizations such as companies, the clerical process of registering information of the correspondence between superiors and subordinates or the clerical process of transferring a request for approval from a subordinate to a superior has been dealt with collectively by a specific department, such as the accounting department or the personnel department, which is indirect to the parties concerned. With such a system structure, the employees can focus their energy on doing their own work, and the specific department can collectively manage the clerical processes of the other departments from an independent point of view. This makes it possible to effectively prevent fraudulent activities such as a fraudulent registration of correspondence between a superior and a subordinate in terms of approvals.

Patent Document 1: Japanese Laid-Open Patent Application No. 8-180114

Patent Document 2: Japanese Laid-Open Patent Application No. 2000-315234

However, due to the quickly changing industrial structures in recent years, business operations are often reorganizing or newly creating organization units to go with the flow of the times. This makes it difficult to maintain the collective management of clerical processes of the departments by such an independent department, making it inevitable to transfer at least part of the clerical processes to the other departments.

SUMMARY OF THE INVENTION

The object of the present invention is therefore to provide approval authority registration system and method that prevent fraudulent activities such as a fraudulent registration of correspondence between a superior and a subordinate in terms of approvals, and at the same time enable each business operation to easily perform such clerical processes.

The above object is fulfilled by an approval authority registration system which comprises terminals, a database, and a database management apparatus interconnected via a network and registers, with the database, approval relation information which shows relationships between approval-authorized persons and approval object persons who are both users of the approval authority registration system, wherein the database management apparatus includes: a receiving unit operable to receive, from a user via a terminal, a registration request requesting registration of a piece of approval relation information; a judging unit operable to judge whether the user who input the registration request matches either an approval-authorized person or an approval object person specified in the requested piece of approval relation information; and a registration unit operable to register the piece of approval relation information with the database if the judging unit judges that the user matches neither the specified approval-authorized person nor the specified approval object person.

The above object is also fulfilled by an approval authority registration method for use in a database management apparatus comprised in an approval authority registration system which comprises terminals and a database as well, and registers approval relation information with the database, wherein the database management apparatus, the terminals, and the database are interconnected via a network, the approval relation information showing relationships between approval-authorized persons and approval object persons who are both users of the approval authority registration system, wherein the approval authority registration method includes: a receiving step for receiving, from a user via a terminal, a registration request requesting registration of a piece of approval relation information; a judging step for judging whether the user who input the registration request matches either an approval-authorized person or an approval object person specified in the requested piece of approval relation information; and a registration step for registering the piece of approval relation information with the database if the judging unit judges that the user matches neither the specified approval-authorized person nor the specified approval object person.

The above object is also fulfilled by an approval authority registration program for use in a database management apparatus comprised in an approval authority registration system which comprises terminals and a database as well, and registers approval relation information with the database, wherein the database management apparatus, the terminals, and the database are interconnected via a network, the approval relation information showing relationships between approval-authorized persons and approval object persons who are both users of the approval authority registration system, wherein the approval authority registration program includes: a receiving step for receiving, from a user via a terminal, a registration request requesting registration of a piece of approval relation information; a judging step for judging whether the user who input the registration request matches either an approval-authorized person or an approval object person specified in the requested piece of approval relation information; and a registration step for registering the piece of approval relation information with the database if the judging unit judges that the user matches neither the specified approval-authorized person nor the specified approval object person.

The above object is also fulfilled by a computer-readable recording medium recording therein an approval authority registration program for use in a database management apparatus comprised in an approval authority registration system which comprises terminals and a database as well, and registers approval relation information with the database, wherein the database management-apparatus, the terminals, and the database are interconnected via a network, the approval relation information showing relationships between approval-authorized persons and approval object persons who are both users of the approval authority registration system, wherein the approval authority registration program includes: a receiving step for receiving, from a user via a terminal, a registration request requesting registration of a piece of approval relation information; a judging step for judging whether the user who input the registration request matches either an approval-authorized person or an approval object person specified in the requested piece of approval relation information; and a registration step for registering the piece of approval relation information with the database if the judging unit judges that the user matches neither the specified approval-authorized person nor the specified approval object person.

The above-mentioned construction prevents the parties concerned from registering correspondence between a superior and a subordinate in terms of approvals in each business operation. This prevents arbitrary registrations and therefore prevents fraudulent activities such as a fraudulent registration of correspondence between a superior and a subordinate in terms of approvals. Also, the above-mentioned construction enables each business operation to easily and quickly perform the registration with a simple system construction since the required judgment standards of registering the approval relation information is simple.

In the above-stated approval authority registration system, the database may include an attribute database with which user attribute information showing attributes of the users is registered, the judging unit may further judge whether an attribute of the user who input the registration request satisfies a predetermined condition by referring to the user attribute information, and the registration unit may register the piece of approval relation information with the database if the judging unit judges that the attribute of the user satisfies the predetermined condition.

With the above-mentioned construction, the registrars who can register the approval relation information are limited to the people who satisfy predetermined qualification conditions. This prevents an approval-authorized person or an approval object person from selecting, by design, a proxy registrar who is not a responsible person, thus preventing fraudulent registration of the approval relation information.

In the above-stated approval authority registration system, the judging unit may further judge whether an attribute of the specified approval-authorized person satisfies a predetermined condition by referring to the user attribute information, and the registration unit may register the piece of approval relation information with the database if the judging unit judges that the attribute of the specified approval-authorized person satisfies the predetermined condition.

With the above-mentioned construction, the approval-authorized persons to be registered with the database are limited to the approval-authorized persons who satisfy predetermined qualification conditions. This prevents indiscriminate registrations of approval-authorized persons.

In the above-stated approval authority registration system, the receiving unit may further receive, from a user via a terminal, a registration request requesting registration of a piece of approval relation information specifying a proxy approval-authorized person, the judging unit may further judge whether the user who input the latter registration request matches an approval-authorized person indicated by a piece of approval relation information that has already been registered with the database, and the registration unit may register the latter piece of approval relation information with the database if the judging unit judges that the user who input the latter registration request matches the approval-authorized person indicated by the already-registered piece of approval relation information.

With the above-mentioned construction, if an approval-authorized person is absent, the approval process is smoothly executed, with a person registered as a proxy approval-authorized person acting as proxy for the absent approval-authorized person.

In the above-stated approval authority registration system, each piece of approval relation information may further include (i) effective period information that indicates an effective period of the piece of approval relation information and (ii) user information that indicates a user who input a registration request requesting registration of the piece of approval relation information, and the database management apparatus may further include: a storage unit operable to store a list of notification destinations respectively corresponding to the users of the approval authority registration system; a monitoring unit operable to monitor, at regular intervals, effective period information included in one or more pieces of approval relation information which, among pieces of approval relation information having been registered with the database, specify proxy approval-authorized persons, and operable to judge whether any of the one or more pieces of approval relation information has an effective period end date that is within a predetermined range of days including a day on which the monitoring unit is currently monitoring; and a notification unit operable to, if the monitoring unit judges that one of the one or more pieces of approval relation information has an effective period end date that is within the predetermined range of days, notifies a notification destination corresponding to a user indicated by the one of the one or more pieces of approval relation information, of the judgment result by the monitoring unit.

With the above-mentioned construction, even if a user inputs an inappropriate effective period start date into a terminal, the user is notified of the fact via the screen of the terminal, and can reenter a correct date. This prevents the approval process from delaying due to generation of a no-approval-authorized-person period in the department concerned.

In the above-stated approval authority registration system, the registration unit may further register a piece of update history information with the database each time a user newly registers or updates a piece of approval relation information, the receiving unit further receives, from a user via a terminal, a request to obtain a piece of update history information, and the database management apparatus may further include a history information distribution unit operable to read the requested piece of update history information from the database and distribute the read piece of update history information to the terminal.

With the above-mentioned construction, each time a piece of approval relation information is registered, a record of the parties who are concerned with the registration is registered with the database. This makes it possible to, if a fraudulent activity is conducted, identify with ease a person who is responsible for the fraudulent activity.

In the above-stated approval authority registration system, the receiving unit may further receive an approval request from a user via a terminal, and the database management apparatus may further include: an identifying unit operable to identify, by referring to approval relation information registered with the database, an approval-authorized person to whom the user, as an approval object person, corresponds; an approval request distribution unit operable to distribute the received approval request to the identified approval-authorized person; an obtaining unit operable to obtain approval information, which indicates an approval or a denial by the approval-authorized person in response to the approval request, from the approval-authorized person via a terminal; and an approval information distribution unit operable to distribute the obtained approval information to the user who sent the approval request.

With the above-mentioned construction, it is possible to perform easily and quickly the process of requesting an approval based on the approval relationships that have been registered in advance.

In the above-stated approval authority registration system, each piece of approval relation information to be registered and having been registered with the database may include responsible person classification information that indicates whether an approval-authorized person specified in the piece of approval relation information is a responsible person or proxy, wherein if the receiving unit receives a piece of approval relation information with responsible person classification information indicating that an approval-authorized person is proxy, the judging unit judges whether the user who input a registration request requesting registration of the received piece of approval relation information matches a responsible person indicated by a piece of approval relation information that has already been registered with the database, and the registration unit registers the received piece of approval relation information with the database if the judging unit judges that the user who input the registration request matches the responsible person indicated by the already-registered piece of approval relation information.

With the above-mentioned construction, an approval-authorized person can specify a person who has an appropriate duty position, as a person who can act as proxy for the approval-authorized person himself/herself. With such arrangement, if the approval-authorized person is absent, the approval process is smoothly executed by the proxy approval-authorized person. Also, since the proxy approval-authorized person has an appropriate duty position, indiscriminate registrations of proxy approval-authorized persons can be prevented.

The above object is also fulfilled by an approval authority registration system which comprises terminals and a database management apparatus interconnected via a network and registers approval relation information showing relationships between approval-authorized persons and approval object persons who are both users of the approval authority registration system, wherein the database management apparatus includes: a database that stores, in advance, registered approval-authorized person identification information for identifying registered approval-authorized persons among the users; a receiving unit operable to receive, from a user via a terminal, a registration request that requests to newly register apiece of proxy approval relation information that specifies (i) one of the users as a proxy approval-authorized person and (ii) a different one of the users as a proxy approval object person; a judging unit operable to judge whether the user who input the registration request has been registered as an approval-authorized person, by referring to the registered approval-authorized person identification information stored in the database; a registration unit operable to newly register (i) the piece of proxy approval relation information and (ii) a piece of proxy approval relation registration history information that shows a history of registrations of proxy approval relation information by the user, with the database if the judging unit judges that the user has been registered as an approval-authorized person; and a history information distribution unit operable to, if the receiving unit receives a request to obtain the piece of proxy approval relation registration history information from a user via a terminal, distribute the piece of proxy approval relation registration history information to the terminal via which the request to obtain the piece of proxy approval relation registration history information was received.

With the above-mentioned construction, an approval-authorized person can specify a person who can act as proxy for the approval-authorized person himself/herself. With such arrangement, if the approval-authorized person is absent, the approval process is smoothly executed by the proxy approval-authorized person. Also, each user of the approval authority registration system can monitor the registration history of the proxy approval-authorized person so that if a fraudulent registration of proxy approval-authorized person occurs, the user can detect it easily.

BRIEF DESCRIPTION OF THE DRAWINGS

These and the other objects, advantages and features of the invention will be come apparent from the following description thereof taken in conjunction with the accompanying drawings which illustrate a specific embodiment of the invention.

In the drawings:

FIG. 4 shows an example of the registration information contained in the personal master information database 1031;

FIG. 5 shows an example of the department-specific approval relation information;

FIG. 6 shows an example of the department-specific update history information;

FIG. 7 shows an example of the individual approval relation information;

FIG. 8 shows an example of the individual update history information;

FIG. 9 shows an example of the approval request information;

FIG. 10 shows an example of the approval information;

FIG. 19 shows an example of the proxy registration period notification message;

FIGS. 20A and 20B show examples of the composite notification messages;

FIG. 22 shows an example of the warning message of generation of a no-approval-authorized-person period.

DESCRIPTION OF THE PREFERRED EMBODIMENT

The following describes a preferred embodiment of the present invention.

<Construction>

Figure 1:
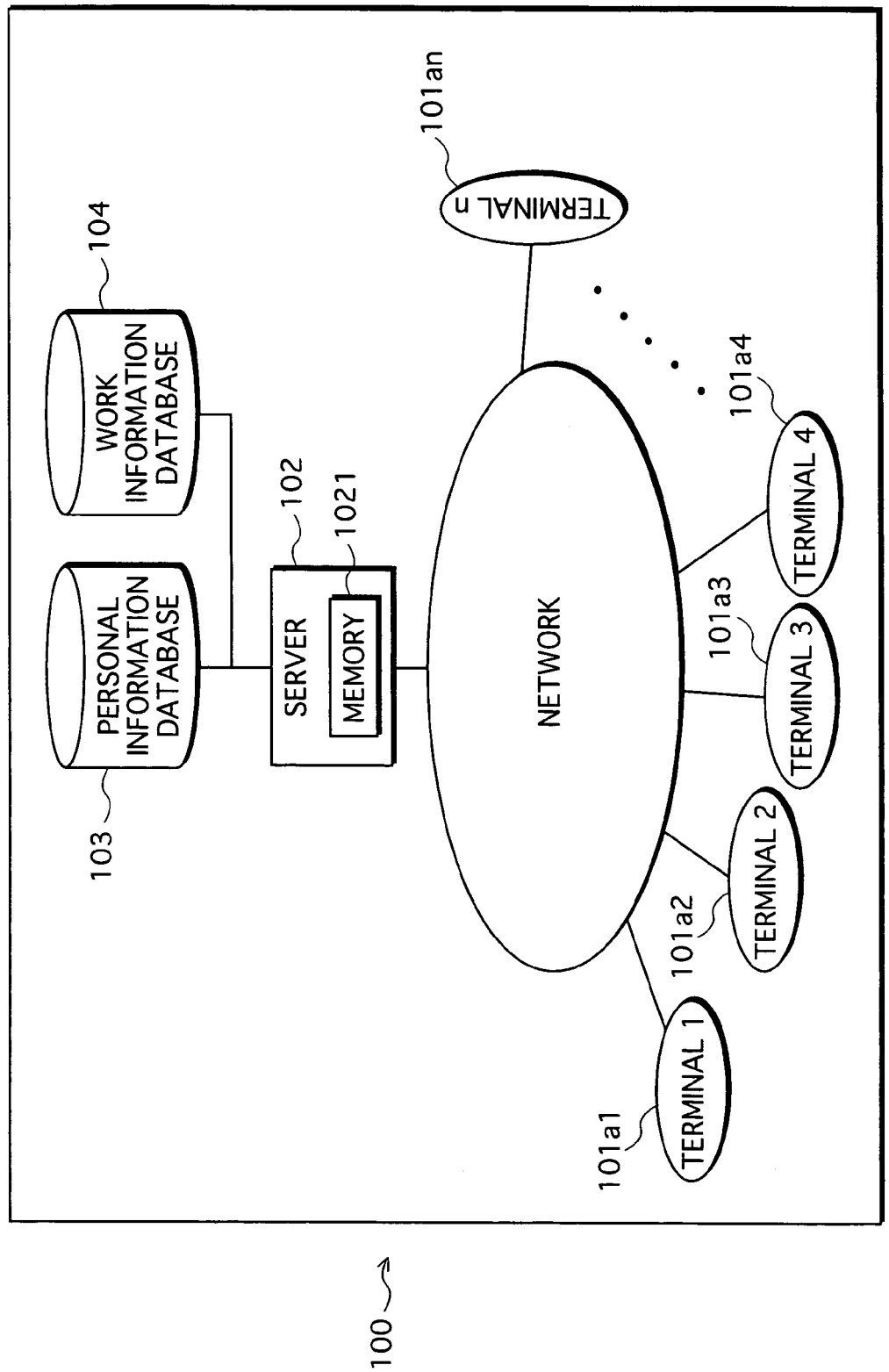
FIG. 1 is a functional block diagram showing the construction of the approval authority registration system 100.

FIG. 1 is a functional block diagram showing the construction of an approval authority registration system 100. As shown in FIG. 1, the approval authority registration system 100 includes terminals 101a1-101an, a server 102, a personal information database 103, and a work information database 104.

Each of the terminals 101a1-101an is composed of a CPU, a memory, an input apparatus (for example, a keyboard or a mouse), a display apparatus (for example, a liquid crystal display or a cathode-ray tube) and the like. The terminals 101a1-101an are classified into (a) subordinate terminals used by people who request an approval (hereinafter, such requesters are referred to as subordinates) to an approval-authorized person, (b) superior terminals used by people (approval-authorized persons) who have the authority to determine whether to approve the approval requests contained in approval request information received from subordinate terminals (hereinafter, people having the authority are referred to as superiors), and (c) registrar terminals used by registrars who register approval relation information.

Each piece of "approval request information" includes: a business operation code for identifying the business operation to which a subordinate who made an approval request belongs; department information for identifying the department to which the subordinate as the requester belongs; approval item information that indicates an item for approval; approval request management number for identifying the piece of approval request information; approval requester information for identifying a subordinate who requested an approval (in the present embodiment, an employee code, which is a number for identifying an employee, is used for identifying the subordinate); approval request contents information indicating the contents of the approval request; and an approval request date/time. FIG. 9 shows an example of the approval request information.

It should be noted here that the words within the parentheses, which explains the meaning of the digit sequence before the words, are provided for the sake of convenience.

The "approval relation information" shows relationships between superiors and subordinates who are objects of the approval authority exercised by the superiors. The approval relation information is classified into two types: "department-specific" and "individual".

Each piece of department-specific approval relation information includes: a business operation code for identifying the business operation to which a superior and a subordinate belong; approval object department information for identifying the department in which the superior exercise the approval authority; approval-authorized person information for identifying the superior (in the present embodiment, the employee code is used for identifying the superior); approval-authorized person classification information indicating whether the superior is a responsible person or proxy; a registration date; registrar information for identifying a registrar (in the present embodiment, the employee code is used for identifying the registrar); an effective period start date indicating the starting date of an effective period of the piece of approval relation information; and effective period end date indicating the ending date of the effective period of the piece of approval relation information.

FIG. 5 shows an example of the department-specific approval relation information.

It should be noted here that in FIG. 5, the words within the parentheses, which explains the meaning of the digit sequence before the words, are provided for the sake of convenience. It is presumed that the example of the department-specific approval relation information shown in FIG. 5 indicates that the production technology department of the Keihan business operation made an organizational change effective on Jul. 1, 2002, that Shiro SHIJO was registered with the department-specific approval relation information as the new responsible person, succeeding Taro KITAHAMA, and that Hanako MARUTAMACHI was registered as the proxy.

Figure 21A:
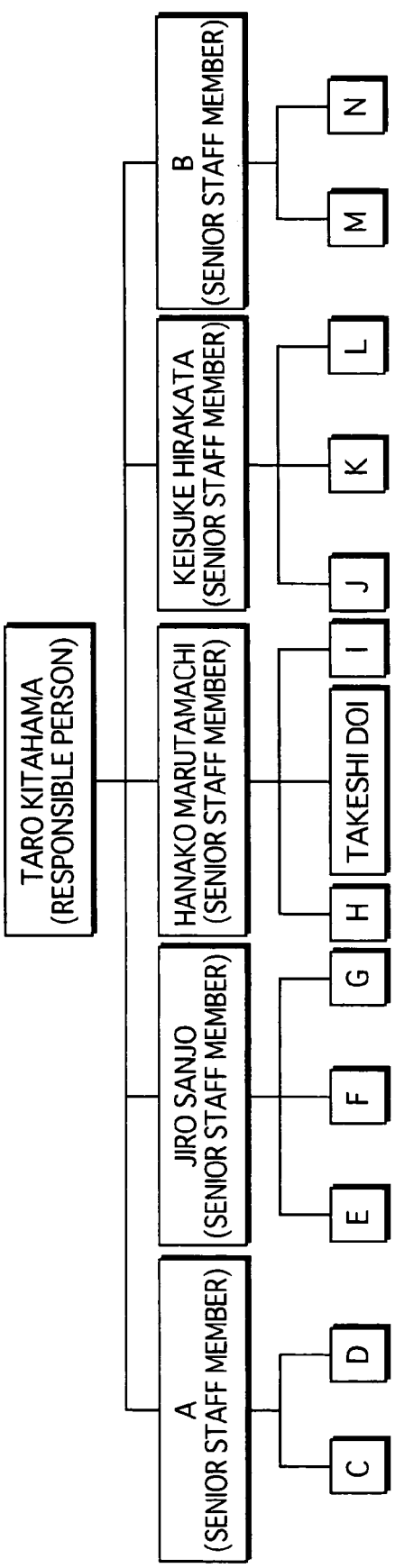
FIG. 21A and FIG. 21B show organization charts of the production technology department of the Keihan business operation before and after the organizational change, respectively.
Figure 21B:
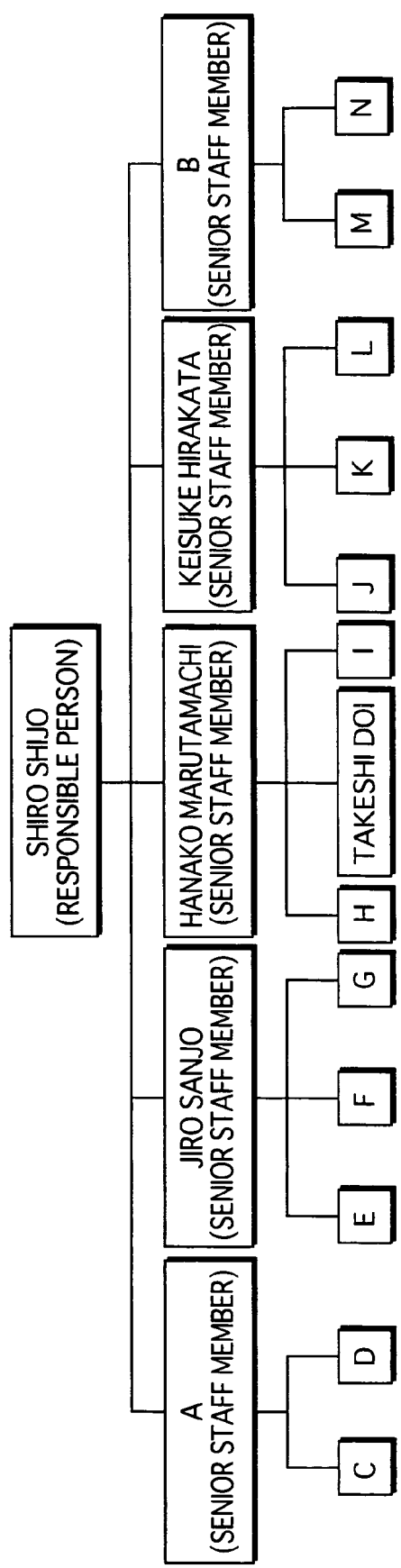

FIG. 21A and FIG. 21B show organization charts of the production technology department of the Keihan business operation before and after the organizational change, respectively.

Each piece of individual approval relation information includes: a business operation code for identifying the business operation to which a superior and a subordinate belong; approval-authorized person information for identifying the superior; approval-authorized person classification information; approval object person information for identifying the subordinate (in the present embodiment, the employee code is used for identifying the subordinate); a registration date; registrar information; an effective period start date indicating the starting date of an effective period of the pieces of approval relation information; and an effective period end date indicating the ending date of the effective period of the piece of approval relation information.

FIG. 7 shows an example of the individual approval relation information.

It should be noted here that in FIG. 7, the words within the parentheses, which explains the meaning of the digit sequence before the words, are provided for the sake of convenience.

A subordinate terminal transmits approval request information, which is input thereto by a subordinate, to a superior terminal via the server 102, and receives approval information, which is input by a superior, from the superior terminal via the server 102.

It should be noted here that subordinates may input approval request information to superior terminals or registrar terminals, and the input approval request information may be transmitted from the terminals to the server 102.

Each piece of "approval information" includes: a business operation code for identifying the business operation to which the subordinate who made an approval request belongs; approval-authorized person information for identifying a superior of the subordinate; approval item information; an approval request management number; approval requester information for identifying the subordinate who requested the approval; consideration results information indicating the results of consideration of whether to approve or not; and approval/denial date.

FIG. 10 shows an example of the approval information.

It should be noted here that in FIG. 10, the words within the parentheses, which explains the meaning of the digit sequence before the words, are provided for the sake of convenience.

The approval information can be obtained in various ways. As one example, a subordinate may input a request for the approval information into a subordinate terminal so that the subordinate terminal has the server 102 read the approval information from the database 104. As another example, the server 102 may obtain the approval information from a superior terminal and transmit the obtained approval information to a subordinate terminal used by a subordinate specified by the approval information.

Alternatively, a subordinate may input data necessary for obtaining the approval information (for example, a password, an employee code, and an approval request management number) into a superior terminal or a registrar terminal, and obtain the approval information from the server 102 at the terminal where the subordinate has input the data.

Superior terminals obtain the approval request information from the server 102, create the approval information based on the obtained approval request information and approval/denial information input by the superior, and transmit the created approval information to the server 102.

A superior may use a subordinate terminal or a registrar terminal instruct to connect to the server 102 by inputting necessary data (for example, a password and an employee code) into the subordinate or registrar terminal, obtain the approval request information from the server 102 at the terminal where the superior has input the data, create the approval information based on the obtained approval request information and approval/denial information input by the superior, and transmit the created approval information to the server 102.

The approval request information can be obtained in various ways. As one example, a superior may input a request for the approval request information into a superior terminal so that the superior terminal has the server 102 read the approval request information from the database 104. As another example, the server 102 may obtain the approval request information from a subordinate terminal and transmit the obtained approval request information to a superior terminal used by a superior specified by the approval request information.

Registrar terminals receive, from registrars, input of a request requesting registration or update of the approval relation information, together with the approval relation information itself, and transmit the approval relation information to the server 102, requesting the registration or update of the approval relation information.

Alternatively, registrars may input the request requesting registration or update of the approval relation information into subordinate or superior terminals.

Figure 2:
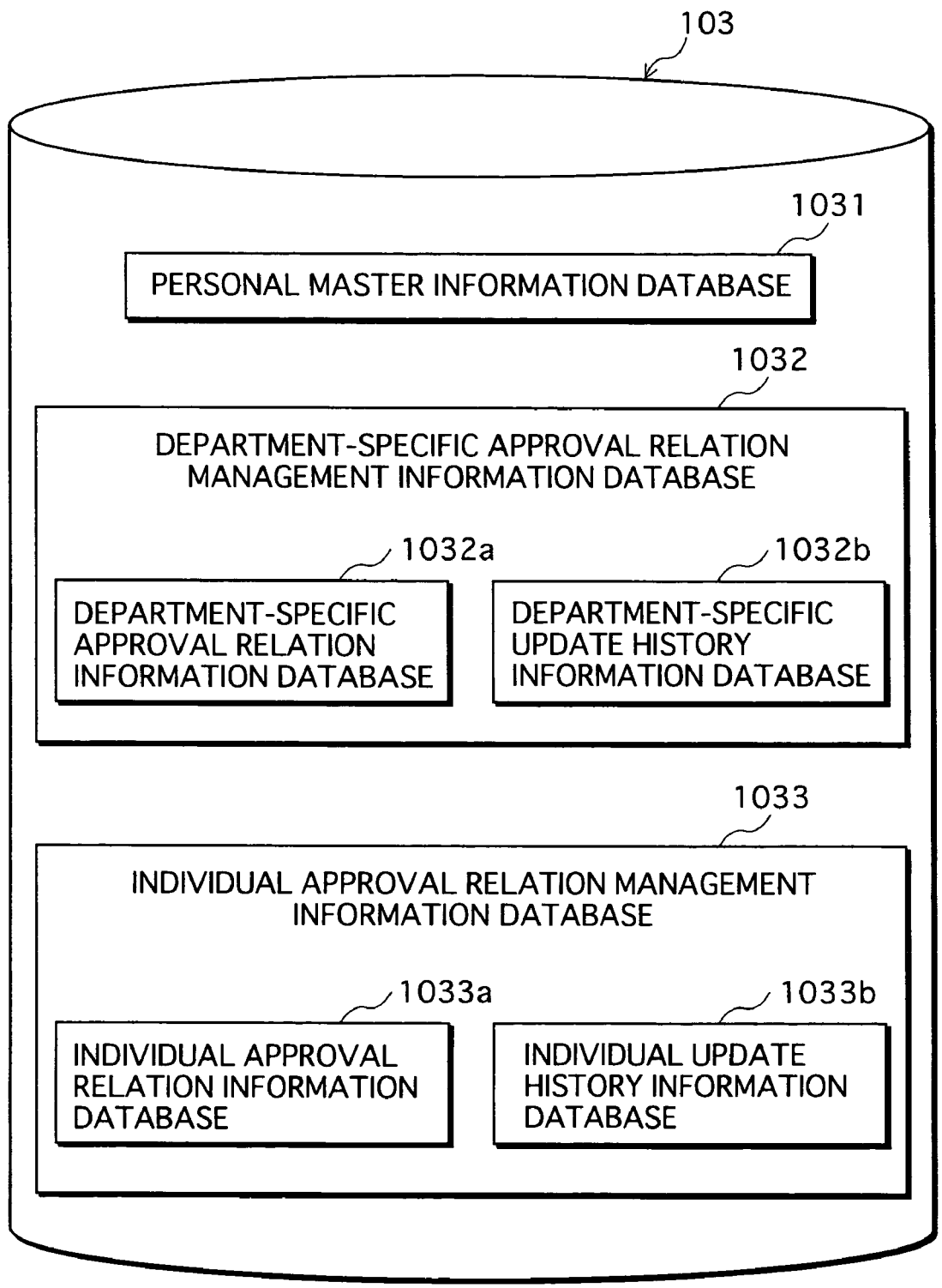
FIG. 2 is a functional block diagram showing the construction of the personal information database 103.

FIG. 2 is a functional block diagram showing the construction of the personal information database 103.

The personal information database 103 includes a personal master information database 1031, a department-specific approval relation management information database 1032, and an individual approval relation management information database 1033.

The personal master information database 1031 contains "registration information" that is information of each employee.

Each piece of registration information includes: an employee code; employee's name; a business operation code for identifying the business operation to which the employee belongs; department information for identifying the department to which the employee-belongs; special classification information for identifying the position of the employee; approval-authorized person qualification information indicating whether the employee is qualified to be a superior; registration qualification information indicating whether the employee is qualified to register the approval relation information; an effective period start date indicating the starting date of an effective period of the piece of registration information; and effective period end date indicating the ending date of the effective period of the piece of registration information.

FIG. 4 shows an example of the registration information contained in the personal master information database 1031.

It should be noted here that in FIG. 4, the words within the parentheses, which explains the meaning of the digit sequence before the words, are provided for the sake of convenience.

The department-specific approval relation management information database 1032 is composed of a department-specific approval relation information database 1032a and a department-specific update history information database 1032b. The department-specific approval relation information database 1032a contains department-specific approval relation information, which has already been explained earlier.

The department-specific update history information database 1032b contains department-specific update history information.

The "department-specific update history information" is information indicating the update history of the department-specific approval relation information, and is registered by the server 102 each time a registrar terminal newly registers or updates a piece of department-specific approval relation information. More specifically, each piece of department-specific update history information includes: (i) information for identifying: business operation code; approval object department information; approval-authorized person information; registration date; and registrar information which are shown in a piece of department-specific approval relation information that is newly registered or updated, and (ii) update detail information indicating how the piece of department-specific approval relation information has been registered or updated.

FIG. 6 shows an example of the department-specific update history information.

It should be noted here that in FIG. 6, the words within the parentheses, which explains the meaning of the digit sequence before the words, are provided for the sake of convenience.

The individual approval relation management information database 1033 is composed of an individual approval relation information database 1033a and an individual update history information database 1033b. The individual approval relation information database 1033a contains individual approval relation information, which has already been explained earlier.

The individual update history information database 1033b contains individual update history information.

The "individual update history information" is information indicating the update history of the individual approval relation information, and is registered by the server 102 each time a registrar terminal newly registers or updates a piece of individual approval relation information. More specifically, each piece of individual update history information includes: the business operation code, the approval-authorized person information, and the approval object person information shown in a piece of individual approval relation information that is newly registered or updated; a registration date; registrar information for identifying a registrar; and update detail information indicating how the piece of individual approval relation information has been registered or updated.

FIG. 8 shows an example of the individual update history information.

It should be noted here that in FIG. 8, the words within the parentheses, which explains the meaning of the digit sequence before the words, are provided for the sake of convenience.

Figure 3:
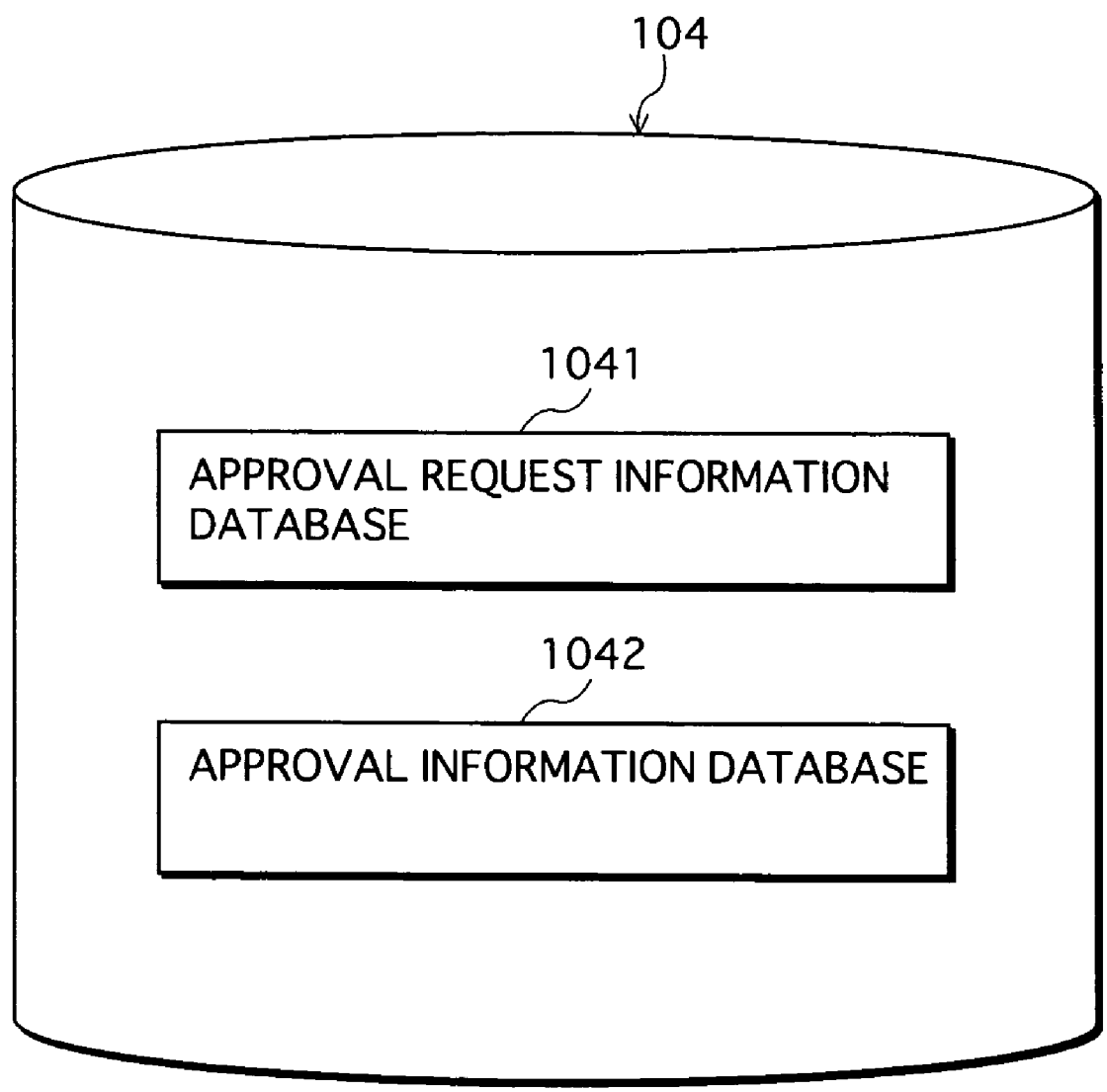
FIG. 3 is a functional block diagram showing the construction of the work information database 104.

FIG. 3 is a functional block diagram showing the construction of the work information database 104.

The work information database 104 is composed of an approval request information database 1041 and an approval information database 1042. The approval request information database 1041 contains the approval request information, which has been explained earlier.

The approval information database 1042 contains the approval information.

It should be noted here that the terminals 101a1-101an of the approval authority registration system 100 can access the information contained in each database via the server 102, and that each employee can refer to the contents of each database via any of the terminals 101a1-101an.

The server 102 is composed of a CPU, a memory, an input apparatus (for example, a keyboard or a mouse), a display apparatus (for example, a liquid crystal display or a cathode-ray tube) and the like, and performs the following processes: registration and management of the approval request information and the approval information with the work information database 104; registration and management of the approval relation information with the personal information database 103; history information distribution; and proxy registration period notification.

A memory 1021 included in the server 102 (see FIG. 1) stores: a terminal identification table that shows the correspondence between employee codes of all employees and addresses of terminals used by the employees; various notification messages such as a proxy registration period notification message and a warning message of generation of a no-approval-authorized-person period, as will be described later; and display data used for displaying various registration screens.

Firstly, the process of registration and management of the approval request information and the approval information with the work information database 104 will be explained.

Upon receiving the approval request information from a subordinate terminal, the server 102 registers the received approval request information with the work information database 104, refers to the department-specific approval relation information database 1032a in the personal information database 103 to identify, among pieces of approval relation information registered with the department-specific approval relation information database 1032a, a piece of approval relation information in which (i) the effective period, which spans from the effective period start date to the effective period end date, is set to include the approval request date of the received approval request information and (ii) the department specified in the approval object department information is the same as the department specified in the received approval request information, and identifies an employee code of the approval-authorized person specified in the identified piece of approval relation information. Also, the server 102 refers to the individual approval relation information database 1033a in the personal information database 103 to identify, among pieces of approval relation information registered with the individual approval relation information database 1033a, a piece of approval relation information in which (i) the effective period, which spans from the effective period start date to the effective period end date, is set to include the approval request date of the received approval request information and (ii) the employee code specified in the approval object person information is the same as the employee code specified in the approval requester information in the received approval request information, and identifies an employee code of the approval-authorized person specified in the identified piece of approval relation information. The server 102 then identifies an address of a superior terminal that corresponds to the identified employee code of the approval-authorized person by referring to the terminal identification table, and transmits the received approval request information to the identified address of the superior terminal.

Upon receiving an approval request information obtainment request from a superior terminal, the server 102 refers to the department-specific approval relation information database 1032a and the individual approval relation information database 1033a in the personal information database 103 to identify an approval object department or person that is approval object of the approval-authorized person identified by the employee code received together with the approval request information obtainment request, reads, from the approval request information database 1041, a piece of approval request information requested by the identified approval object department or person, and transmits the read approval request information to the superior terminal that transmitted the approval request information obtainment request. If the server 102 fails to find, in the database, any piece of approval request information satisfying the above-mentioned conditions, the server 102 reads a message for notification of the fact from the memory 1021, and transmits the message to the superior terminal.

Upon receiving the approval information from a superior terminal, the server 102 registers the received approval information with the approval information database 1042, deletes, from the approval request information database 1041, a piece of approval request information that has the same approval request management number as the received approval information, identifies an address of a subordinate terminal corresponding to an employee code specified in the approval requester information in the received approval information, by referring to the terminal identification table, and transmits the received approval information to the identified address of the subordinate terminal.

Upon receiving an approval information obtainment request from a subordinate terminal, the server 102 identifies a piece of approval information based on the approval request management number that is received together with the request, reads the identified piece of approval information from the approval information database 1042, and transmits the read piece of approval information to the subordinate terminal that transmitted the approval information obtainment request. If any piece of approval information corresponding to the received approval request management number is not registered with the approval information database 1042, the server 102 transmits a message for notification of the fact to the subordinate terminal that transmitted the approval information obtainment request.

Secondly, the process of registration and management of the approval relation information with the personal information database 103 will be explained.

Upon receiving a request requesting registration or update of a piece of approval relation information from a registrar terminal, the server 102 judges whether an employee, who has an employee code that is received together with the approval relation information register/update request, is qualified as a registrar by referring to the registration qualification information in the personal-master information database 1031 that corresponds to the received employee code. If having judged positively, that is, judged that the employee is qualified as a registrar, the server 102 performs the department-specific or individual registration process which will be explained later, in accordance with an instruction from the registrar terminal. If having judged negatively, that is, judged that the employee is not qualified as a registrar, the server 102 reads a message for notification of the fact from the memory 1021, transmits the read message to registrar terminal, and ends the process.

In the above-described procedure, if the server 102 receives an instruction to execute the department-specific registration process from the registrar terminal, the server 102 executes the department-specific registration process; and if it receives an instruction to execute the individual registration process, the server 102 executes the individual registration process.

The department-specific registration process and the individual registration process executed by the server 102 will be described later.

Next, a history information distribution process executed by the server 102 will be described.

Upon receiving a request to obtain the department-specific update history information, individual update history information, or approval information (hereinafter, the three types of information are generically referred to as history information) from a subordinate terminal, a superior terminal, or a registrar terminal, the server 102 checks whether an employee code of the requester who entered the request into the terminal (the requester inputs the employee code to the terminal when entering the request) is registered with the personal master information database 103. If the employee code of the requester is registered with the database, the server 102 reads the requested piece of history information from a corresponding database, and distributes the read piece of history information to the terminal that requested the information.

The history information distribution process executed by the server 102 will be described in detail later.

Next, a proxy registration period notification process executed by the server 102 will be described.

The server 102 monitors, at regular intervals (for example, every 24 hours), the effective period end date for the proxy specified in each piece of approval relation information registered with the department-specific approval relation information database 1032a and the individual approval relation information database 1033a, the effective period end date being registered in the department-specific registration process and the individual registration process. If it detects that the day on which the monitoring is performed is within a predetermined range of days before the effective period end date, the server 102 generates a message based on a proxy registration period notification message, and transmits the generated message to the registrar terminal indicated by the approval relation information.

It should be noted here that the "proxy registration period notification message" is a message for notification that "the registered effective period for proxy expires within a predetermined range of days". FIG. 19 shows an example of the proxy registration period notification message.

The proxy registration period notification process executed by the server 102 will be described in detail later.

<Operation>

The following describes the process of registering and managing the approval relation information with the personal information database 103, which is performed by the server 102.

Figure 11:
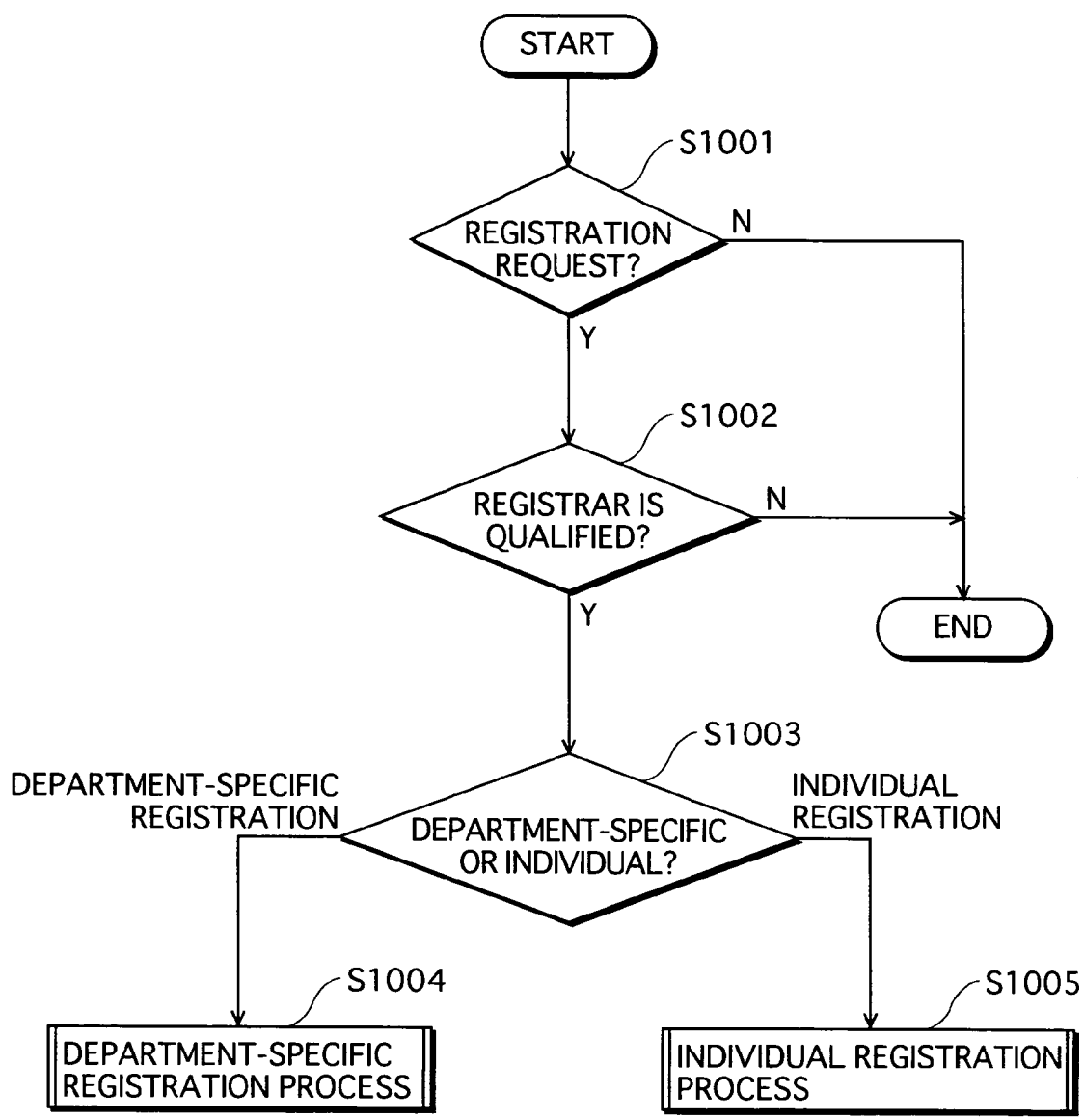
FIG. 11 is a flowchart showing the procedures of the process of registering and managing the approval relation information with the personal information database 103.

FIG. 11 is a flowchart showing the procedures of the process. Now, the procedures will be described with reference to FIG. 11.

When the server 102 receives, from a registrar terminal, a registration request requesting registration of a piece of approval relation information, together with an employee code for identifying the user who input the registration request (step S1001: Y), the server 102 judges whether the user who input the registration request is qualified as a registrar, by referring to a piece of registration qualification information that corresponds to the received employee code and is stored in the personal master information database 1031 (step S1002). If the user is qualified as a registrar (step S1002: Y), the server 102 reads, from the memory 1021, display data that is used to display a screen containing a Graphical User Interface (GUI) that helps the user specify whether the registration request is the department-specific or individual registration request, and causes the screen to be displayed on a display apparatus of the registrar terminal based on the read display data, and judges whether the registration request is the department-specific or individual registration request by checking the specification input by the user through the GUI (step S1003).

If the received registration request is found to be department-specific registration request, the server 102 performs the department-specific registration process (step S1004). If the received registration request is found to be individual registration request, the server 102 performs the individual registration process (step S1005).

If it is judged in step S1002 that the user is not qualified as a registrar (step S1002: N), the server 102 ends the registration management process.

Figure 17:
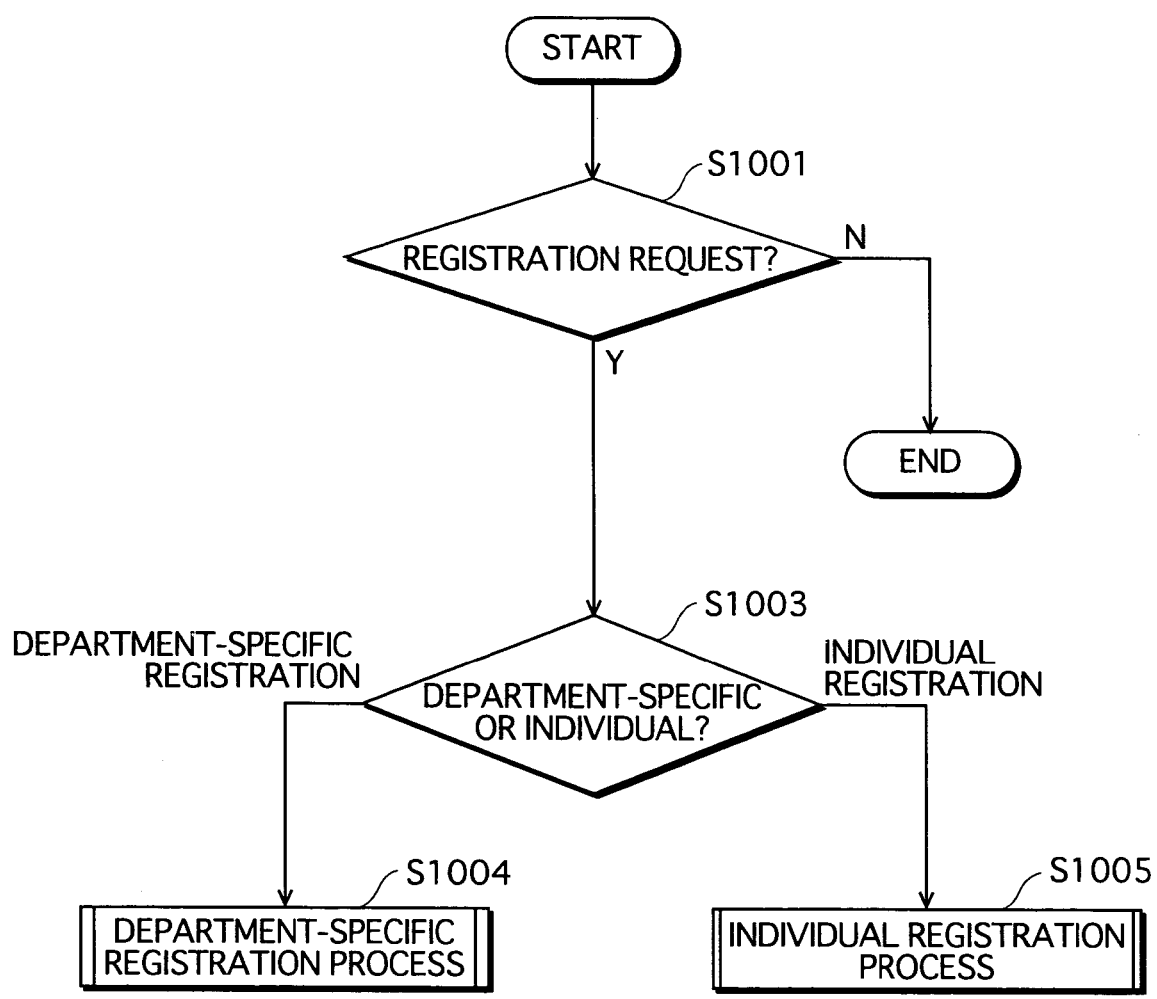
FIG. 17 shows a flowchart of the process, performed by the server 102, of registering and managing the approval relation information with the personal information database 103, which is the same as the flowchart shown in FIG. 11 except that step S1002 is omitted.

The flowchart shown in FIG. 11 may be used for the same process even without the step S1002. FIG. 17 shows such a flowchart of the process of registering and managing the approval relation information with the personal information database 103, which is performed by the server 102.

Figure 12:
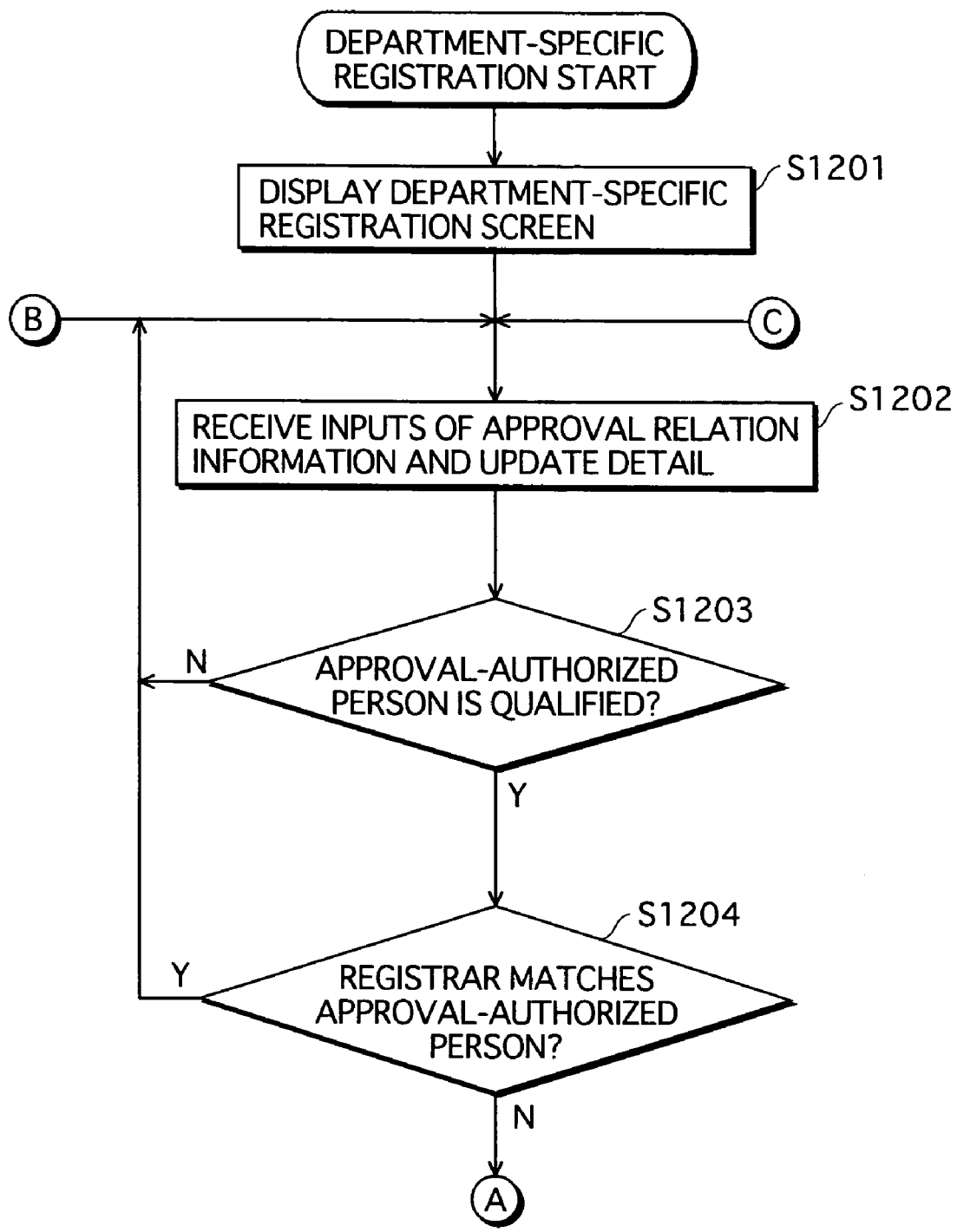
FIGS. 12 and 13 are flowcharts showing the procedures of the department-specific registration process.
Figure 13:
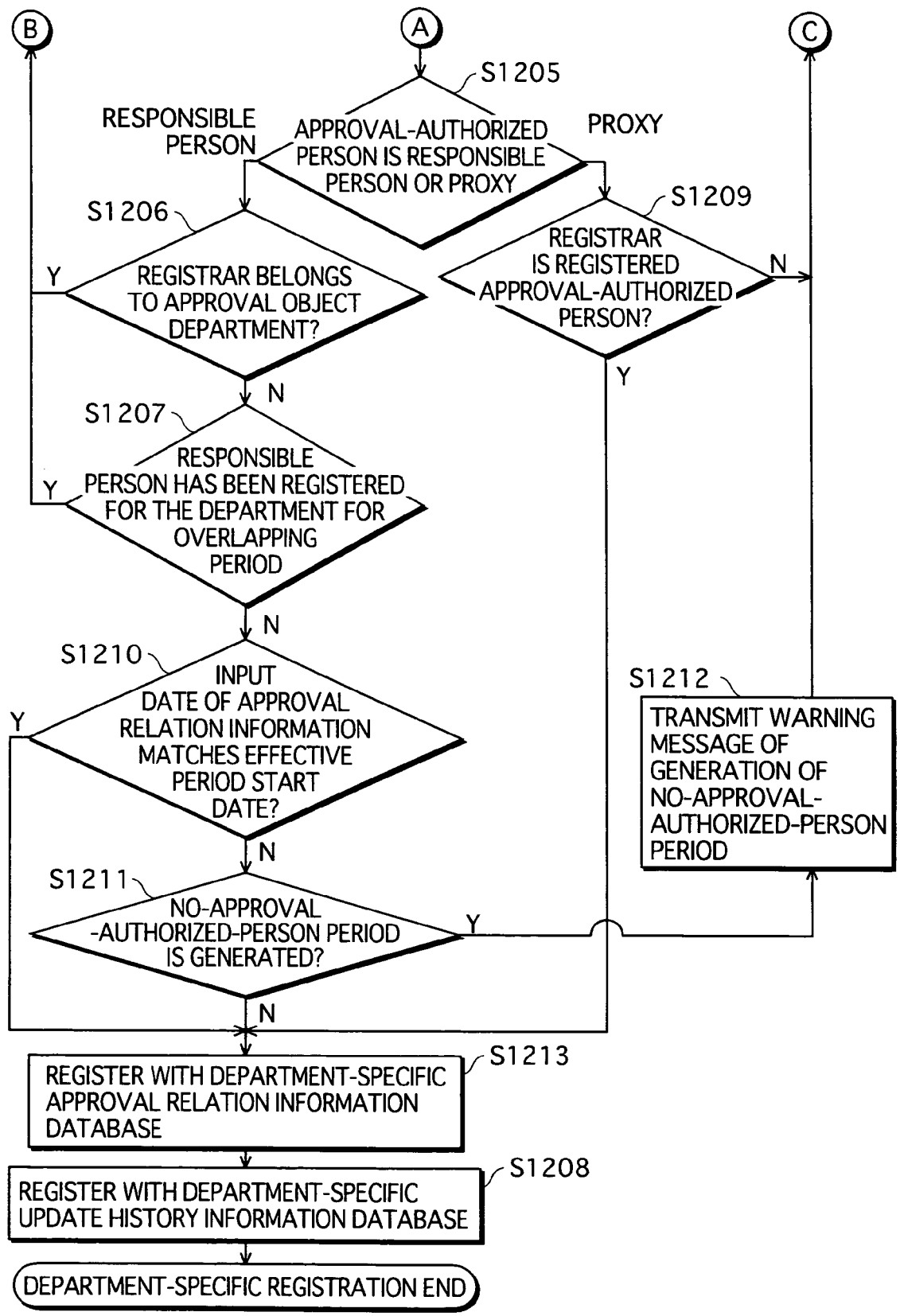

The following describes the department-specific registration process performed by the server 102. FIGS. 12 and 13 are flowcharts showing the procedures of the department-specific registration process. Now, the procedures will be described with reference to FIGS. 12 and 13.

The server 102 reads, from the memory 1021, display data that is used to display a department-specific registration screen containing a GUI for receiving an input from the user, transmits the read display data to the registrar terminal, causing the registrar terminal to display the department-specific registration screen (step S1201). The server 102 then receives inputs of a piece of approval relation information and an update detail from the registrar terminal via the registration screen (step S1202). The server 102 then judges whether the approval-authorized person specified in the input piece of approval relation information is qualified as an approval-authorized person, by referring to the approval-authorized person qualification information stored in the personal master information database 1031 (step S1203).

If it is judged that the specified person is qualified as an approval-authorized person (step S1203: Y), the server 102 judges whether the registrar matches the approval-authorized person, by judging whether the employee code of the registrar indicated in the input piece of approval relation information matches the employee code of the approval-authorized person indicated in the approval-authorized person qualification information (step S1204).

If it is judged that the registrar does not match the approval-authorized person (step S1204: N), the server 102 judges whether the approval-authorized person is responsible person or proxy, by referring to the approval-authorized person classification information included in the input piece of approval relation information (step S1205).

If it is judged in step S1205 that the approval-authorized person is responsible person (step S1205: "responsible person"), the server 102 judges whether the registrar belongs to the approval object department, by judging whether the approval object department indicated in the approval relation information matches the department to which the registrar registered with the personal master information database 1031 belongs (step S1206).

If it is judged in step S1206 that the registrar does not belong to the approval object department (step S1206: N), the server 102 refers to the department-specific approval relation information database 1032a and judges whether the responsible person for the approval object department indicated by the input piece of approval relation information has already been registered with the department-specific approval relation information database 1032a for an effective period that overlaps with the effective period indicated by the input piece of approval relation information, where the effective period is recognized as a period between the effective period start date and the effective period end date (step S1207) If it is judged in step S1207 that the responsible person of the approval object department has not been registered (step S1207: N), the server 102 judges whether the day on which the approval relation information was input matches the effective period start date indicated by the approval relation information (step S1210). If it is judged in step S1210 that the day on which the approval relation information was input does not match the effective period start date (step S1210: N), the server 102 judges whether the registration of the currently input data of the approval relation information is to generate a no-approval-authorized-person period (step S1211). More specifically, for the judgment in step S1211, the server 102 checks to see whether a piece of approval relation information (if there are a plurality of pieces of approval relation information, one of them), which indicates the same approval object department as the input piece of approval relation information and has an effective period end date that continues to (that is, immediately before) the effective period start date of the input piece of approval relation information, has already been registered with the department-specific approval relation information database 1032a.

If it is judged in step S1210 that the day on which the approval relation information was input matches the effective period start date (step S1210: Y), or if it is judged in step S1211 that the registration of the currently input data of the approval relation information is not to generate a no-approval-authorized-person period since a piece of approval relation information having an effective period end date that continues to the effective period start date of the input piece of approval relation information has already been registered with the department-specific approval relation information database 1032a (step S1211: N), the server 102 registers the input piece of approval relation information with the department-specific approval relation information database 1032a (step S1208). The server 102 then creates a piece of department-specific update history information based on the input piece of approval relation information and the input update detail, and registers the created piece of department-specific update history information with the department-specific update history information database 1032b (step S1213).

If it is judged in step S1211 that the registration of the currently input data of the approval relation information is to generate a no-approval-authorized-person period since no piece of approval relation information having an effective period end date that continues to the effective period start date has been registered with the department-specific approval relation information database 1032a (step S1211: Y), the server 102 reads a warning message of generation of a no-approval-authorized-person period from the memory 1021, transmits the read message to the registrar terminal (step S1212), and moves to step S1202.

It should be noted here that the "warning message of generation of a no-approval-authorized-person period" is a warning message that is stored in the memory 1021 in advance, for notifying that if the input piece of approval relation information is registered, a no-approval-authorized-person period will be generated.

FIG. 22 shows an example of the warning message of generation of a no-approval-authorized-person period.

If it is judged in step S1205 that the approval-authorized person is proxy (step S1205: "proxy"), the server 102 judges whether the registrar is an approval-authorized person having been registered with the department-specific approval relation information database 1032a by judging whether an approval-authorized person having the same employee code as the registrar in the input piece of approval relation information has been registered with the department-specific approval relation information database 1032a (step S1209). If it is judged in step S1209 that the registrar is a registered approval-authorized person (step S1209: Y), the server 102 registers the input piece of approval relation information with the department-specific approval relation information database 1032a (step S1208). The server 102 then creates a piece of department-specific update history information based on the input piece of approval relation information and the input update detail, and registers the created piece of department-specific update history information with the department-specific update history information database 1032b (step S1213).

If it is judged that the specified person is not qualified as an approval-authorized person (step S1203: N), or if it is judged that the registrar matches the approval-authorized person (step S1204: Y), or if it is judged in step S1206 that the registrar belongs to the approval object department (step S1206: Y), or if it is judged in step S1207 that the responsible person of the approval object department has been registered (step S1207: Y), or if it is judged in step S1209 that the registrar is not a registered approval-authorized person (step S1209: N), the server 102 returns to step S1202.

It should be noted here that the above-described procedures for the department-specific registration process can be applied to dealing with an update request that is received from a registrar terminal and is a request for updating a piece of approval relation information having been registered with the department-specific approval relation information database 1032a. In this case, the server 102 may delete the registered piece of approval relation information when it registers an updated version of the piece of approval relation information.

Figure 14:
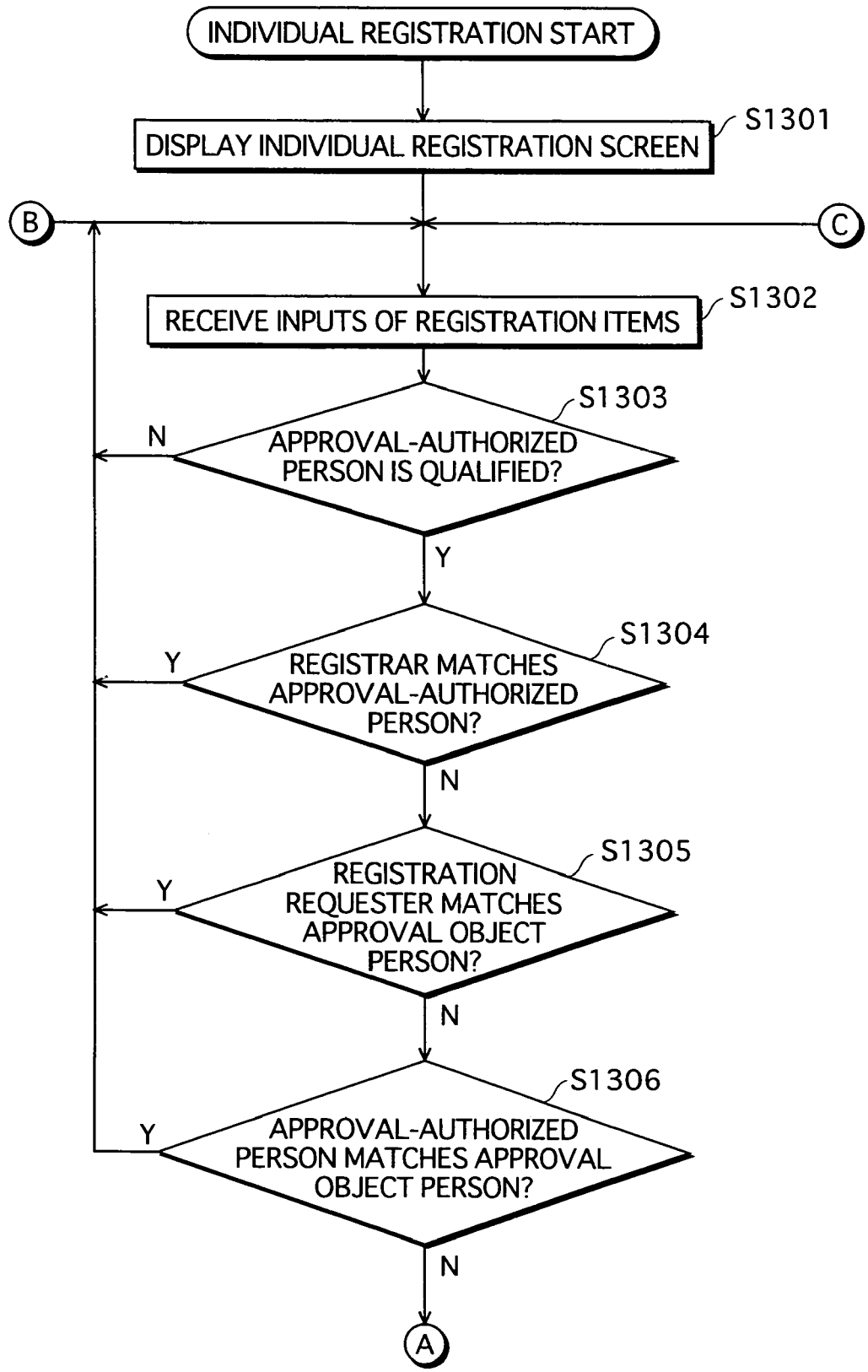
FIGS. 14 and 15 are flowcharts showing the procedures of the individual registration process.
Figure 15:
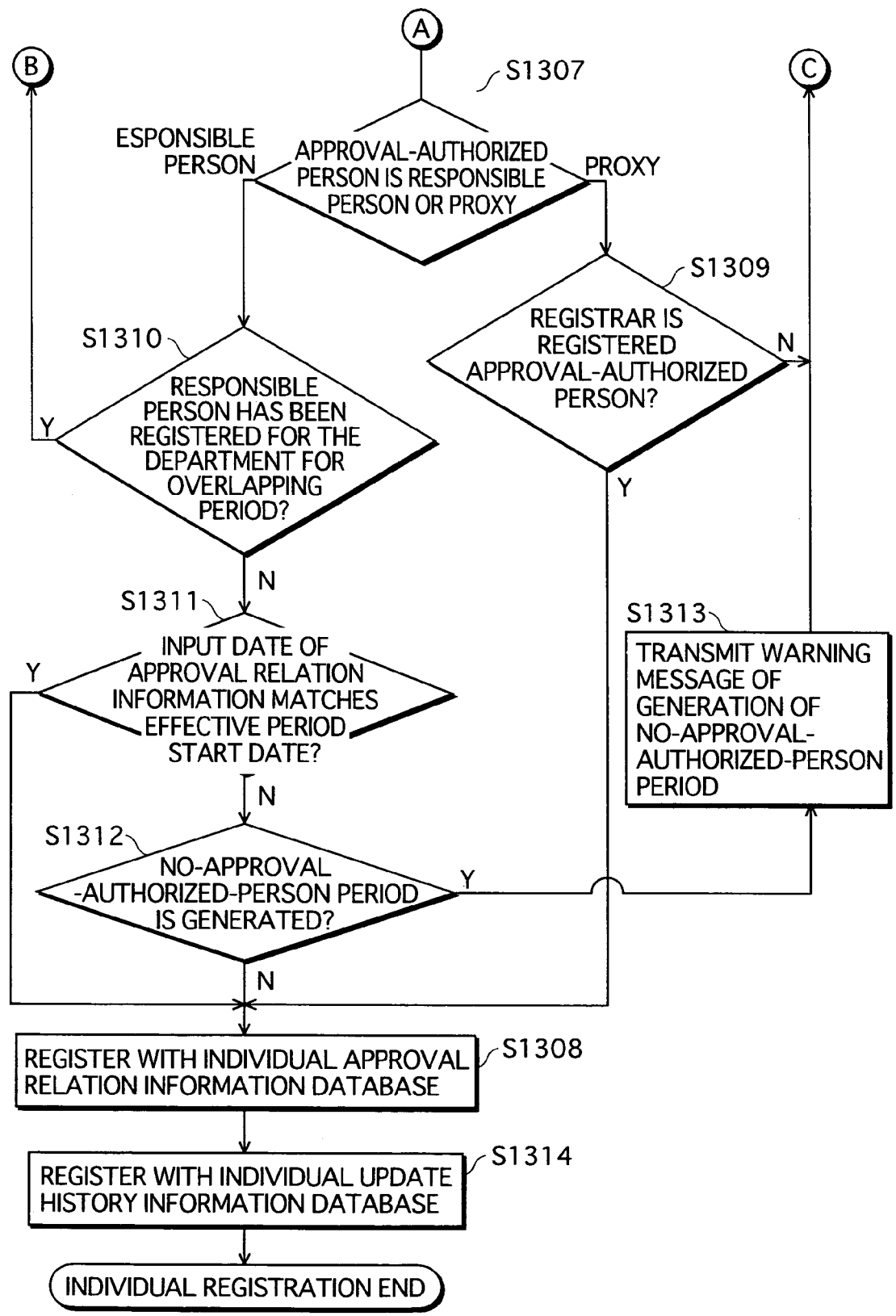

The following describes the individual registration process performed by the server 102. FIGS. 14 and 15 are flowcharts showing the procedures of the individual registration process. Now, the procedures will be described with reference to FIGS. 14 and 15.

The server 102 reads, from the memory 1021, display data that is used to display an individual registration screen containing a GUI for receiving an input from the user, transmits the read display data to the registrar terminal, causing the registrar terminal to display the individual registration screen (step S1301). The server 102 then receives a piece of approval relation information for registration from the registrar terminal via the registration screen (step S1302). The server 102 then judges whether the approval-authorized person specified in the input piece of approval relation information is qualified as an approval-authorized person, by referring to the approval-authorized person qualification information stored in the personal master information database 1031 (step S1303).

If it is judged that the specified person is qualified as an approval-authorized person (step S1303: Y), the server 102 judges whether the registrar matches the approval-authorized person, by judging whether the employee code of the registrar indicated in the input piece of approval relation information matches the employee code of the approval-authorized person indicated in the approval-authorized person qualification information (step S1304).

If it is judged that the registrar does not match the approval-authorized person (step S1304: N), the server 102 judges whether the registrar matches the approval object person, by judging whether the employee codes of the registrar and the approval object person indicated in the input piece of approval relation information match (step S1305).

If it is judged that the registrar does not match the approval object person (step S1305: N), the server 102 judges whether the approval-authorized person matches the approval object person, by judging whether the employee codes of the approval-authorized person and the approval object person indicated in the input piece of approval relation information match (step S1306).

If it is judged that the approval-authorized person does not match the approval object person (step S1306: N), the server 102 judges whether the approval-authorized person is responsible person or proxy, by referring to the approval-authorized person classification information included in the input piece of approval relation information (step S1307).

If it is judged in step S1307 that the approval-authorized person is responsible person (step S1307: "responsible person"), the server 102 refers to the individual approval relation information database 1033a and judges whether the responsible person for the approval object person indicated by the input piece of approval relation information has already been registered with the individual approval relation information database 1033a for an effective period that overlaps with the effective period indicated by the input piece of approval relation information, where the effective period is recognized as a period between the effective period start date and the effective period end date (step S1310). If it is judged in step S1310 that the responsible person for the approval object person has not been registered (step S1310: N), the server 102 judges whether the day on which the approval relation information was input matches the effective period start date indicated by the approval relation information (step S1311). If it is judged in step S1311 that the day on which the approval relation information was input does not match the effective period start date (step S1311: N), the server 102 judges whether the registration of the currently input data of the approval relation information is to generate a no-approval-authorized-person period (step S1312) More specifically, for the judgment in step S1312, the server 102 checks to see whether a piece of approval relation information, which indicates the same approval object person as the input piece of approval relation information and has an effective period end date that continues to (that is, immediately before) the effective period start date of the input piece of approval relation information, has already been registered with the individual approval relation information database 1033a.

If it is judged in step S1311 that the day on which the approval relation information was input matches the effective period start date (step S1311: Y), or if it is judged in step S1312 that the registration of the currently input data of the approval relation information is not to generate a no-approval-authorized-person period since a piece of approval relation information having an effective period end date that continues to the effective period start date of the input piece of approval relation information has already been registered with the individual approval relation information database 1033a (step S1312: N), the server 102 registers the input piece of approval relation information with the individual approval relation information database 1033a (step S1308). The server 102 then creates apiece of individual update history information based on the input piece of approval relation information and the input update detail, and registers the created piece of individual update history information with the individual update history information database 1033b (step S1314).

If it is judged in step S1312 that the registration of the currently input data of the approval relation information is to generate a no-approval-authorized-person period since no piece of approval relation information having an effective period end date that continues to the effective period start date has been registered with the individual approval relation information database 1033a (step S1312: Y), the server 102 reads a warning message of generation of a no-approval-authorized-person period from the memory 1021, transmits the read message to the registrar terminal (step S1313), and moves to step S1302.

If it is judged in step S1307 that the approval-authorized person is proxy (step S1307: "proxy"), the server 102 judges whether the registrar is an approval-authorized person having been registered with the individual approval relation information database 1033a by judging whether an approval-authorized person having the same employee code as the registrar in the input piece of approval relation information has been registered with the individual approval relation information database 1033a (step S1309). If it is judged in step S1309 that the registrar is a registered approval-authorized person (step S1309: Y), the server 102 registers the input piece of approval relation information with the individual approval relation information database 1033a (step S1308). The server 102 then creates apiece of individual update history information based on the input piece of approval relation information and the input update detail, and registers the created piece of individual update history information with the individual approval relation information database 1033a (step S1314).

It should be noted here that the above-described procedures for the individual registration process can be applied to dealing with an update request that is received from a registrar terminal and is a request for updating a piece of approval relation information having been registered with the individual approval relation information database 1033a. In this case, the server 102 may delete the registered piece of approval relation information when it registers an updated version of the piece of approval relation information.

Figure 16:
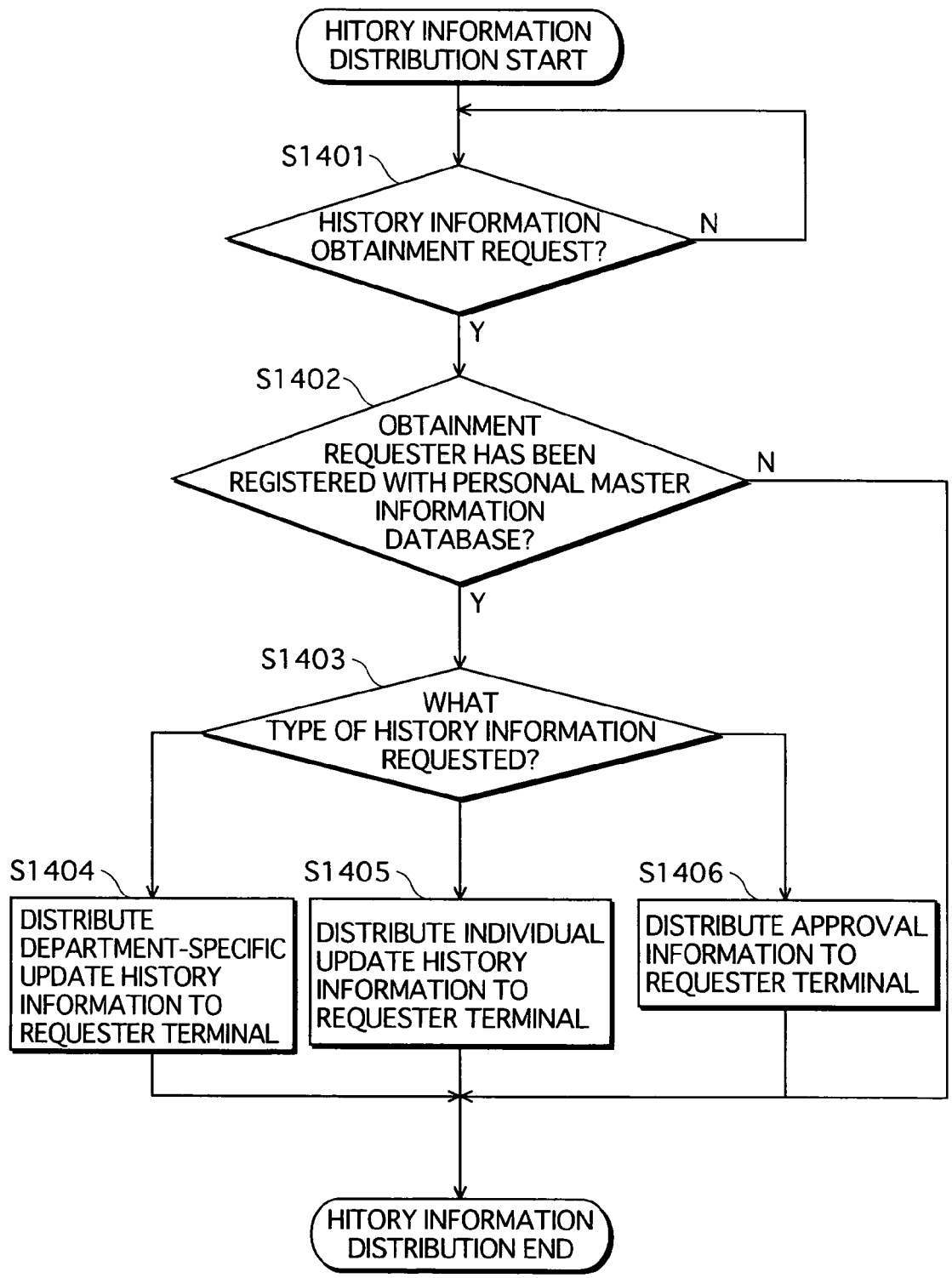
FIG. 16 is a flowchart showing the procedure of the history information distribution process.

The following describes the history information distribution process executed by the server 102. FIG. 16 is a flowchart showing the procedure of the history information distribution process. Now, the history information distribution process will be described with reference to FIG. 16.

When the server 102 has received, from a terminal connected with the server 102 via the network, a request to obtain history information together with inputs of an employee code of the requester and information indicating the type of the desired history information (step S1401: Y), the server 102 judges whether the employee code of the requester has already been registered with the personal master information database 1031 (step S1402). If it is judged that the employee code of the requester has already been registered (step S1402: Y), the server 102 identifies the type of the desired history information (step S1403). The server 102 then reads history information corresponding to the identified type from a corresponding database, and distributes the read history information to the requester terminal (steps S1404, S1405 and S1406).

The following describes the proxy registration period notification process executed by the server 102.

Figure 18:
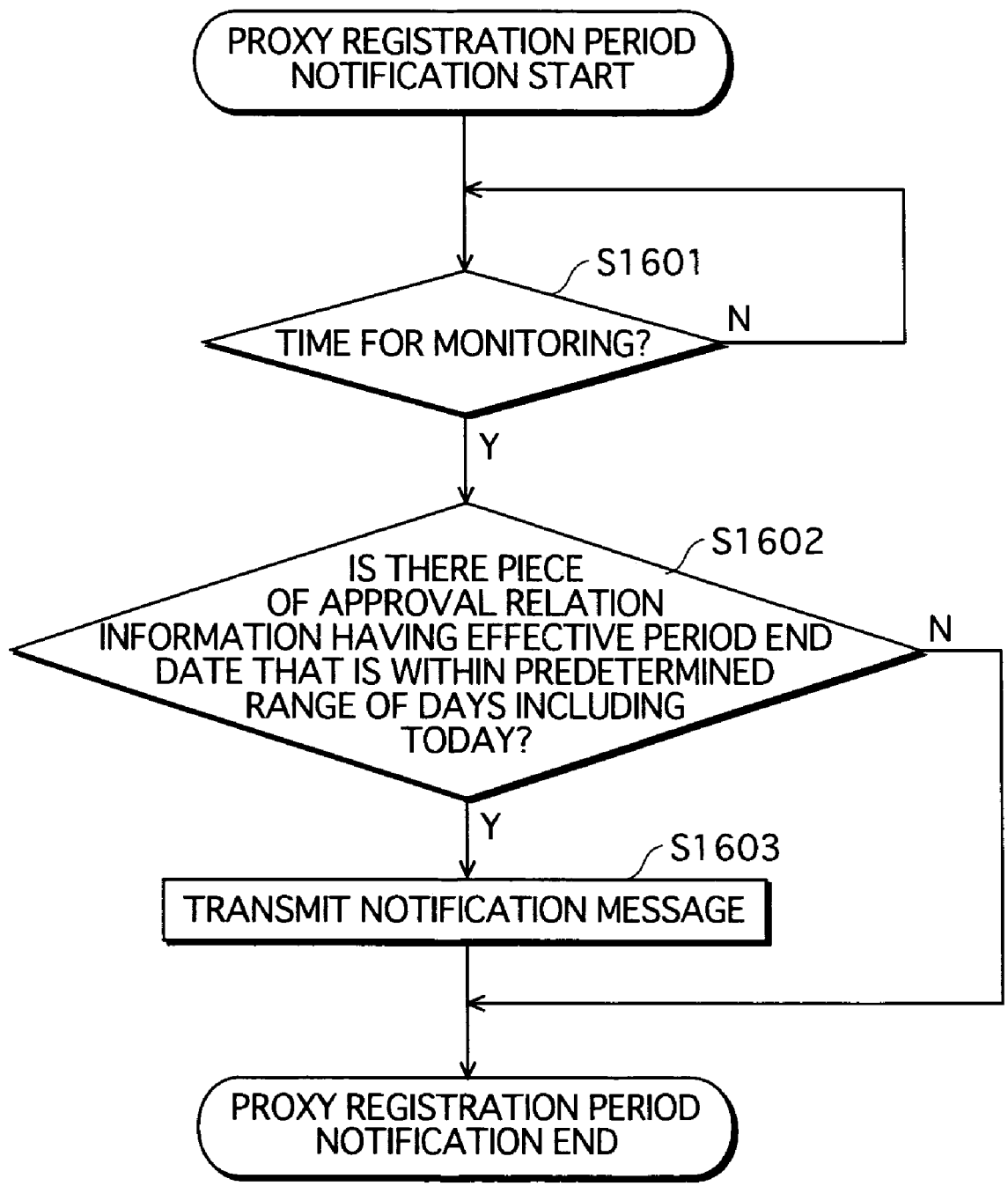
FIG. 18 is a flowchart showing the procedure of the proxy registration period notification performed by the server 102.

FIG. 18 is a flowchart showing the procedure of the proxy registration period notification. Now, the proxy registration period notification process will be described with reference to FIG. 18.

When the time to monitor the proxy registration period has come (it is supposed here, as an example, that the monitoring is performed every 24 hours) (step S1601: Y), the server 102 reads every piece of approval relation information in which "proxy" is specified in the approval-authorized person classification information, from each of the department-specific approval relation information database 1032a and the individual approval relation information database 1033a, and judges whether any of the read pieces of approval relation information has an effective period end date that is within a predetermined range of days including the day on which the server 102 is monitoring (step S1602).

If it is judged in step S1602 that one or more pieces of the read pieces of approval relation information have an effective period end date that is within the predetermined range of days (step S1602: Y), the server 102 identifies the employee code of each registrar indicated by the one or more pieces of approval relation information, identifies, based on the terminal identification table, the address of each terminal corresponding to each identified employee code, reads the "proxy registration period notification message" from the memory 1021, generates composite notification messages by combining the read proxy registration period notification message with (i) the employee codes, (ii) the approval object departments or persons, and (iii) the effective period end dates indicated by the one or more pieces of approval relation information, and transmits the generated notification messages respectively to terminals having the identified addresses (step S1603). FIGS. 20A and 20B show examples of the composite notification messages.

Upon reading such composite notification messages, the registrars can issue various requests such as a request to update a department-specific or individual approval relation information and a request to newly register a piece of approval relation information, to the server 102 via registrar terminals.

If it is judged in step S1602 that any of the read pieces of approval relation information does no have an effective period end date that is within the predetermined range of days (step S1602: N), the server 102 ends the proxy registration period notification process.

The following describes the process of registration and management of the approval request information and the approval information with the work information database 104 that is executed by the server 102.

Figure 23:
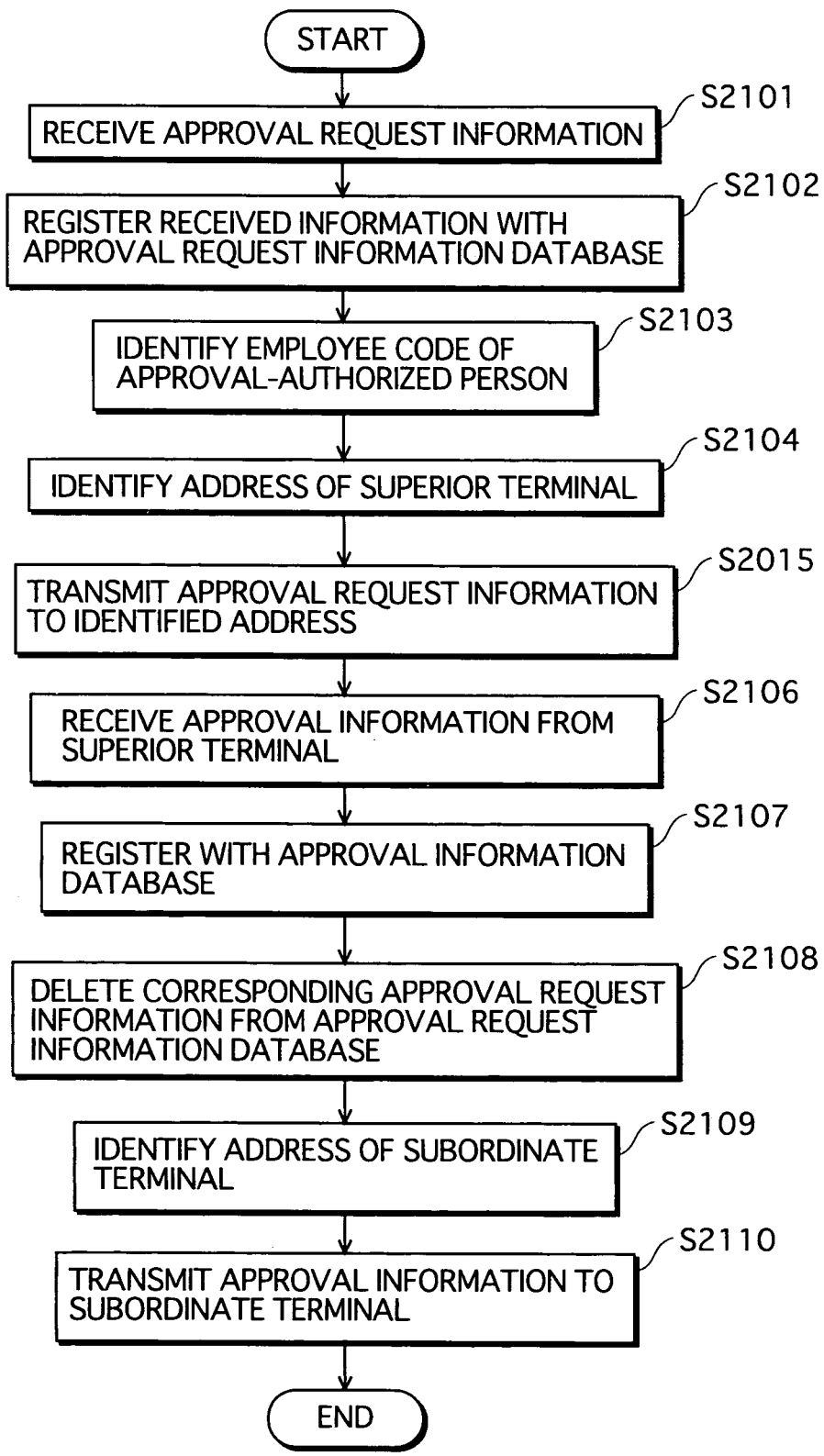
FIG. 23 is a flowchart showing the procedure of the process of registration and management of the approval request information and the approval information with the work information database 104 that is executed by the server 102.

FIG. 23 is a flowchart showing the procedure of the process. Now, the process will be described with reference to FIG. 23.

The server 102 receives a piece of approval request information from a subordinate terminal (step S2101). The server 102 registers the received piece of approval request information with the approval request information database 1041 in the work information database 104 (step S2102). The server 102 refers to the department-specific approval relation information database 1032a and the individual approval relation information database 1033a in the personal information database 103 to retrieve a piece of approval relation information which (i) includes the approval object department information specifying the same department as the department information of the received piece of approval request information, or includes the approval object person information specifying the same employee code as the approval requester information of the received piece of approval request information and (ii) has an effective period, which is a period between the effective period start date and the effective period end date, that includes the approval request date indicated by the received piece of approval request information. The server 102 then identifies the employee code of the approval-authorized person indicated by the retrieved piece of approval relation information (step S2103) The server 102 identifies an address of a superior terminal that corresponds to the identified employee code of the approval-authorized person by referring to the terminal identification table (step S2104), and transmits the received approval request information to the identified address of the superior terminal (step S2105).

The server 102 receives a piece of approval information from the superior terminal (step S2106). The server 102 registers the received piece of approval information with the approval information database 1042 of the work information database 104 (step S2107). The server 102 deletes, from the approval request information database 1041, a piece of approval request information which (i) has been registered with the database 1041 prior to the registration of the received piece of approval information and (ii) has the same approval request management number as the received piece of approval information (step S2108). The server 102 identifies an address of a subordinate terminal that corresponds to the employee code indicated by the approval object person information of the received piece of approval information by referring to the terminal identification table stored in the memory 1021 (step S2109), and transmits the approval information to the identified address of the subordinate terminal (step S2110).

Up to now, the approval authority registration system of the present invention has been described in a preferred embodiment. Not limited to this, however, the present invention can be variously modified. The following provides examples of such.

(1) The registration information stored in the personal master information database 1031 may contain a personal identification number that is used to authenticate an employee. Furthermore, in the procedure of the process of registering and managing the approval relation information with the personal information database 103 shown in FIG. 11, the server 102 may further receive a personal identification number input by the user from the registrar terminal in step S1001, may further judge whether the input personal identification number matches the personal identification number corresponding to the employee code in step S1002, and may perform the process of step S1003 only if the user who input the registration request is qualified as a registrar and the input personal identification number matches the personal identification number corresponding to the employee code.

This enables the system to effectively prevent a user, who is not qualified as a registrar but somehow got to know the employee code of a user qualified as a registrar, from registering a piece of approval relation information by disguising the qualified user using his/her employee code.

(2) The number of times a qualified registrar can register the approval relation information may be limited to a predetermined number of times. More specifically, the number of times is limited to, for example, three or six times per year; the registration information stored in the personal master information database 1031 is arranged to indicate (i) the predetermined number of times a qualified registrar can register and (ii) the number of times the registrar has already registered; each time the registrar registers a piece of approval relation information, the information of the number of times the registrar has already registered is updated; in step S1002 of the procedure of the process of registering and managing the approval relation information shown in FIG. 11, the server 102 judges that the user who input the registration request is not qualified as a registrar if the number of times the registrar has already registered has reached the predetermined number of times the registrar can register.

The above-mentioned arrangement will prevent any registrar from registering the approval relation information an enormous number of times lopsidedly. This effectively prevents a fraudulent act of registration from being conducted by a collusion between a registration object person and a registrar.

(3) In the flowchart shown in FIG. 13, the two steps performed in accordance with the judgment result of step S1206 may be changed with each other. That is to say, if it is judged in step S1206 that the registrar does not belong to the approval object department (step S1206: N), the server 102 may return to step S1202; and if it is judged in step S1206 that the registrar belongs to the approval object department (step S1206: Y), the server 102 may proceed to step S1207.

With the above-mentioned arrangement, when it is required for a department to register a piece of approval relation information in regards with only the members of the department, there is no need to request any departments other than the department itself to register the piece of approval relation information. This simplifies the process of newly registering the approval relation information.

Alternatively, step S1206 may be deleted from the flowchart shown in FIG. 13.

(4) In step S1209 of the flowchart shown in FIG. 13, it may be judged whether the registrar is a registered responsible person, instead of whether the registrar is a registered approval-authorized person.

With the above-described arrangement, the required standards of registering a proxy approval-authorized person become rigorous. This prevents indiscriminate registrations of proxy approval-authorized persons.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An approval authority registration system which comprises terminals, a database, and a database management apparatus interconnected via a network, wherein one or more pieces of approval relation information, each of which indicates a relationship between an approval-authorized person and an approval object person who are both users of the approval authority registration system and indicates an effective period of the relationship, have been registered with the database, wherein the database management apparatus includes:
a receiving unit configured to receive, from a user via a terminal, a registration request requesting registration of a new piece of approval relation information with the database;
a first judging unit configured to judge whether the user who input the registration request matches either an approval-authorized person or an approval object person specified in the requested piece of approval relation information;
a second judging unit configured to, only when the first judging unit has judged that the user matches neither the specified approval-authorized person nor the specified approval object person, judge whether there is a no-approval-authorized-person period between an effective period indicated by the new piece of approval relation information and an effective period indicated by a piece of approval relation information which is one of the one or more pieces of approval relation information having been registered with the database and indicates a same approval object person as the new piece of approval relation information; and
a registration unit configured to register the new piece of approval relation information with the database when the second judging unit has judged that there is no no-approval-authorized-person period, and provide a warning that there is the no-approval-authorized-person period and prevent the new piece of approval relation information from being registered with the database when the second judging unit has judged that there is the no-approval-authorized-person period.

2. The approval authority registration system of claim 1, wherein
the database includes an attribute database with which user attribute information showing attributes of the users is registered,
the first judging unit further judges whether an attribute of the user who input the registration request satisfies a predetermined condition by referring to the user attribute information, and
the second judging unit judges whether there is the no-approval-authorized-person period when the first judging unit has judged that the attribute of the user satisfies the predetermined condition.

3. The approval authority registration system of claim 2, wherein
the first judging unit further judges whether an attribute of the specified approval-authorized person satisfies a predetermined condition by referring to the user attribute information, and
the second judging unit judges whether there is the no-approval-authorized-person period when the first judging unit has judged that the attribute of the specified approval-authorized person satisfies the predetermined condition.

4. The approval authority registration system of claim 1, wherein the receiving unit further receives, from a user via a terminal, a registration request requesting registration of a piece of approval relation information specifying a proxy approval-authorized person, the first judging unit further judges whether the user who input the latter registration request matches an approval-authorized person indicated by a piece of approval relation information that has already been registered with the database, and the registration unit registers the latter piece of approval relation information with the database if the judging unit judges that the user who input the latter registration request matches the approval-authorized person indicated by the already-registered piece of approval relation information.

5. The approval authority registration system of claim 4, wherein each piece of approval relation information further includes user information that indicates a user who input a registration request requesting registration of the piece of approval relation information, and the database management apparatus further includes:

a storage unit configured to store a list of notification destinations respectively corresponding to the users of the approval authority registration system;

a monitoring unit configured to monitor, at regular intervals, one or more effective periods respectively indicated by one or more pieces of approval relation information which, among the one or more pieces of approval relation information having been registered with the database, specify proxy approval-authorized persons; and a notification unit configured to, when the monitoring unit has judged that one of the monitored one or more pieces of approval relation information has an effective period that expires within a predetermined range of days, notifies a notification destination corresponding to a user indicated by the one of the monitored one or more pieces of approval relation information, of the judgment result by the monitoring unit.

6. The approval authority registration system of claim 1, wherein the registration unit further registers a piece of update history information with the database each time a user newly registers or updates a piece of approval relation information, the receiving unit further receives, from a user via a terminal, a request to obtain a piece of update history information, and the database management apparatus further includes a history information distribution unit configured to read the requested piece of update history information from the database and distribute the read piece of update history information to the terminal.

7. The approval authority registration system of claim 1, wherein the receiving unit further receives an approval request from a user via a terminal, and the database management apparatus further includes:

an identifying unit configured to identify, by referring to approval relation information registered with the database, an approval-authorized person to whom the user, as an approval object person, corresponds;

an approval request distribution unit configured to distribute the received approval request to the identified approval-authorized person;

an obtaining unit configured to obtain approval information, which indicates an approval or a denial by the approval-authorized person in response to the approval request, from the approval-authorized person via a terminal; and an approval information distribution unit configured to distribute the obtained approval information to the user who sent the approval request.

8. The approval authority registration system of claim 1, wherein each piece of approval relation information to be registered and having been registered with the database includes responsible person classification information that indicates whether an approval-authorized person specified in the piece of approval relation information is a responsible or proxy, wherein if the receiving unit receives a piece of approval relation information with responsible person classification information indicating that an approval-authorized person is proxy, the first judging unit judges whether the user who input a registration request requesting registration of the received piece of approval relation information matches a responsible person indicated by a piece of approval relation information that has already been registered with the database, and the second judging unit judges whether there is the no-approval-authorized-person period when the first judging unit has judged that the user who input the registration request matches the responsible person.

9. The approval authority registration system of claim 1, wherein in the one or more pieces of approval relation information, the approval-authorized person is defined as a superior of the approval object person and the approval object person is defined as a subordinate of the approval-authorized person.

10. An approval authority registration method for use in a database management apparatus comprised in an approval authority registration system which comprises terminals and a database as well, and registers approval relation information with the database, wherein the database management apparatus, the terminals, and the database are interconnected via a network, and one or more pieces of approval relation information, each of which indicates a relationship between an approval-authorized person and an approval object person who are both users of the approval authority registration system and indicates an effective period of the relationship, have been registered with the database, wherein the approval authority registration method includes:

a receiving step for receiving, from a user via a terminal, a registration request requesting registration of a new piece of approval relation information with the database;

a first judging step for judging whether the user who input the registration request matches either an approval-authorized person or an approval object person specified in the requested piece of approval relation information;

a second judging step for, only when the first judging step has judged that the user matches neither the specified approval-authorized person nor the specified approval object person, judging whether there is a no-approval-authorized-person period between an effective period indicated by the new piece of approval relation information and an effective period indicated by a piece of approval relation information which is one of the one or more pieces of approval relation information having been registered with the database and indicates a same approval object person as the new piece of approval relation information; and a registration step for registering the new piece of approval relation information with the database when the second judging step has judged that there is no no-approval-authorized-person period, and providing a warning that there is the no-approval-authorized-person period and preventing the new piece of approval relation information from being registered with the database when the second judging step has judged that there is the no-approval-authorized-person period.

11. A computer-readable recording medium recording therein an approval authority registration program for use in a database management apparatus comprised in an approval authority registration system which comprises terminals and a database as well, and registers approval relation information with the database, wherein the database management apparatus, the terminals, and the database are interconnected via a network, and one or more pieces of approval relation information, each of which indicates a relationship between an approval-authorized person and an approval object person who are both users of the approval authority registration system and indicates an effective period of the relationship, have been registered with the database, wherein the approval authority registration program includes:

a receiving instruction for receiving, from a user via a terminal, a registration request requesting registration of a new piece of approval relation information with the database;

a first judging instruction for judging whether the user who input the registration request matches either an approval-authorized person or an approval object person specified in the requested piece of approval relation information;

a second judging instruction for, only when the first judging has judged that the user matches neither the specified approval-authorized person nor the specified approval object person, judging whether there is a no-approval-authorized-person period between an effective period indicated by the new piece of approval relation information and an effective period indicated by a piece of approval relation information which is one of the one or more pieces of approval relation information having been registered with the database and indicates a same approval object person as the new piece of approval relation information; and a registration instruction for registering the new piece of approval relation information with the database when the second judging has judged that there is no no-approval-authorized-person period, and providing a warning that there is the no-approval-authorized-person period and preventing that new piece of approval relation information from being registered with the database when the second judging has judged that there is the no-approval-authorized-person period.

\* \* \* \* \*